(12) United States Patent
Sato

(10) Patent No.: US 8,582,147 B2
(45) Date of Patent: Nov. 12, 2013

(54) INFORMATION PROCESSING APPARATUS, CONTROL METHOD FOR IMAGE FORMING APPARATUS AND POST-PROCESSING APPARATUS, AND COMPUTER PROGRAM

(75) Inventor: Junko Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 12/492,845

(22) Filed: Jun. 26, 2009

(65) Prior Publication Data
US 2010/0014115 A1    Jan. 21, 2010

(30) Foreign Application Priority Data

Jul. 15, 2008 (JP) .................................. 2008-183789

(51) Int. Cl.
*G06F 15/00* (2006.01)

(52) U.S. Cl.
USPC ......... 358/1.15; 358/1.13; 358/1.18; 358/537

(58) Field of Classification Search
USPC ...................................... 358/1.13, 1.15, 1.18
See application file for complete search history.

(56) References Cited

U.S. PATENT DOCUMENTS

| | | | |
|---|---|---|---|
| 5,999,945 A * | 12/1999 | Lahey et al. | 1/1 |
| 2001/0055123 A1 | 12/2001 | Ryan et al. | |
| 2003/0159114 A1 * | 8/2003 | Nishikawa et al. | 715/530 |
| 2004/0190057 A1 * | 9/2004 | Takahashi et al. | 358/1.15 |
| 2006/0238793 A1 * | 10/2006 | Akashi et al. | 358/1.13 |
| 2007/0133047 A1 | 6/2007 | Matsueda | |
| 2007/0136117 A1 * | 6/2007 | Matsueda | 705/7 |

FOREIGN PATENT DOCUMENTS

| | | |
|---|---|---|
| CN | 1515991 A | 7/2004 |
| JP | 11-110535 A | 4/1999 |
| JP | 11-134134 A | 5/1999 |
| JP | 2006-285610 A | 10/2006 |
| JP | 2006-309351 A | 11/2006 |

\* cited by examiner

*Primary Examiner* — Allen H Nguyen
(74) *Attorney, Agent, or Firm* — Canon USA, Inc., IP Divison

(57) ABSTRACT

An information processing apparatus configured to control an image forming apparatus and a post-processing apparatus configured to execute post-processing on a product output by the image forming apparatus includes a registration unit configured to register a job ticket, a searching unit configured to search for a job ticket that can be used for issuing an instruction to the post-processing apparatus from among the job tickets registered by the registration unit, and an instruction unit configured to issue an instruction to the post-processing apparatus by utilizing the job ticket extracted as a result of the search by the searching unit.

19 Claims, 28 Drawing Sheets

FIG.4A

| NO | ATTRIBUTE INFORMATION | | DESCRIPTIONS |
|---|---|---|---|
| 1 | PRINT METHOD | ONE-SIDED/TWO-SIDED/ BOOKBINDING PRINTING | |
| 2 | PAPER SIZE | DOCUMENT SIZE/FIXED SIZE | · Z-FOLDING WHEN "A4 + A3", "B4 + B3", OR "LETTER + LEDGER (11 * 17) IS DESIGNATED<br>· DOCUMENT SIZE OF FIRST CHAPTER OR FIRST PAGE IS AUTOMATICALLY SELECTED IF BOOKBINDING PRINTING OR N-up PRINTING IS DESIGNATED |
| 3 | PAPER ORIENTATION | PORTRAIT/LANDSCAPE | · PAPER ORIENTATION CAN BE DESIGNATED ONLY WHEN FIXED SIZE IS DESIGNATED |
| 4 | FINISHING SIZE | FIXED SIZE/SIZE DESIGNATED BY USER | |
| 5 | LAYOUT METHOD | LEAF/FOURFOLD/ SADDLE STITCH BINDING/CASE BINDING | |
| 6 | REGISTER AND BLEED (CUTTING MARGIN) | ON/OFF | |
| 7 | BINDING MARGIN/ ORIENTATION | | · SHIFT/MAGNIFICATION CAN BE DESIGNATED |
| 8 | DESIGNATION OF N-up PRINTING | NUMBER OF PAGES/ IMPOSITION/ BORDERLINE/ IMPOSITION PATTERN | · 9 PATTERNS ARE AVAILABLE FOR IMPOSITION<br>· DIRECT PRINTING CAN BE DESIGNATED |
| 9 | MAGNIFICATION AND REDUCTION | ON/OFF | · DESIGNATION OF MAGNIFICATION/ REDUCTION CAN BE AUTOMATICALLY SET "ON" OR "OFF" IF FIXED SIZE IS DESIGNATED FOR PAPER SIZE OR N-up PRINTING IS DESIGNATED |
| 10 | WATERMARK | | · WATERMARK CAN BE INDIVIDUALLY DESIGNATED FOR EACH LOGICAL OR PHYSICAL PAGE<br>· WATERMARK CAN BE DESIGNATED FOR ALL CHAPTERS OR PAGES |
| 11 | HEADER AND FOOTER | | · HEADER AND FOOTER CAN BE INDIVIDUALLY DESIGNATED FOR EACH LOGICAL OR PHYSICAL PAGE<br>· HEADER AND FOOTER CAN BE DESIGNATED FOR ALL CHAPTERS OR PAGES |

FIG.4B

| NO | ATTRIBUTE INFORMATION | | DESCRIPTIONS |
|---|---|---|---|
| 12 | SHEET DISCHARGE METHOD | STAPLING/PUNCHING | · STAPLING AND PUNCHING CAN BE DESIGNATED IF ONE-SIDED OR TWO-SIDED PRINTING IS DESIGNATED<br>· UP TO TWO AREAS CAN BE STAPLED |
| 13 | DETAILED DESIGNATION OF BINDING | DIRECTION OF OPENING/ SADDLE STITCH BINDING/ MAGNIFICATION OR REDUCTION/BINDING MARGIN/VOLUME CLASSIFICATION | · DETAILS CAN BE DESIGNATED IF BOOKBINDING PRINTING IS DESIGNATED |
| 14 | FRONT COVER AND BACK COVER | | · PRINTING DESIGNATION CAN BE SET FOR FRONT COVER 1 OR 2 OR BACK COVER 1 OR 2<br>· SHEET DISCHARGE PORT (INCLUDING INSERTER) CAN BE DESIGNATED |
| 15 | INDEX SHEET | | · PRINTING OF CHARACTER STRING ON INDEX PORTION AND ANNOTATION ON INDEX SHEET CAN BE SET<br>· IF BOOKBINDING PRINTING IS DESIGNATED, INDEX SHEET CANNOT BE DESIGNATED |
| 16 | INSERTED SHEET | | · SHEET DISCHARGE PORT (INCLUDING INSERTER) CAN BE DESIGNATED<br>· DOCUMENT DATA CAN BE PRINTED ON INSERTED SHEET<br>· IF BOOKBINDING PRINTING IS DESIGNATED, INSERTED SHEET CANNOT BE DESIGNATED |
| 17 | CHAPTER BREAK | "NO"/"PAGE-BY-PAGE BREAK"/"SHEET-BY-SHEET BREAK" | · ONLY "SHEET-BY-SHEET BREAK" CAN BE SET WHEN INDEX SHEET OR INSERTED SHEET IS DESIGNATED<br>· ONLY "SHEET-BY-SHEET BREAK" CAN BE SET WHEN ONE-SIDED PRINTING IS DESIGNATED |
| 18 | FINISHING | SADDLE STITCH BINDING/ CASE BINDING/CUTTING | |
| 19 | CASE BINDING COVER SIZE | FIXED SIZE/SIZE DESIGNATED BY USER | |
| 20 | MAGNIFICATION AND REDUCTION OF FINISHING | ON/OFF | |
| 21 | MAGNIFICATION AND REDUCTION OF BLEED | ON/OFF | |

FIG.5

| NO | ATTRIBUTE INFORMATION | | APPLICATION |
|---|---|---|---|
| 1 | PAPER SIZE | DOCUMENT SIZE/ FIXED SIZE | · IF FIXED SIZE IS SELECTED, "PAGE-BY-PAGE BREAK" IS AUTOMATICALLY DESIGNATED<br>· IF A PLURALITY OF TYPES OF SHEETS IS SELECTED IN BOOK, THEN SHEET SIZE CAN BE CHANGED ONLY FOR DESIGNATED SHEET. EVEN IF IT IS DESIGNATED TO SET THE PAPER SIZE ACCORDING TO THE SIZE OF BOOK, PAPER SIZE CAN BE CHANGED |
| 2 | PAPER ORIENTATION | PORTRAIT/ LANDSCAPE | · PAPER ORIENTATION CAN BE SELECTED ONLY WHEN FIXED SIZE IS DESIGNATED |
| 3 | DESIGNATION OF N-up PRINTING | NUMBER OF PAGES/ IMPOSITION/ BORDERLINE/ IMPOSITION PATTERN | · 9 PATTERNS ARE AVAILABLE FOR IMPOSITION<br>· DIRECT PRINTING CAN BE DESIGNATED |
| 4 | MAGNIFICATION AND REDUCTION | ON/OFF | · DESIGNATION OF MAGNIFICATION AND REDUCTION CAN BE AUTOMATICALLY SET "ON" OR "OFF" IF FIXED SIZE IS DESIGNATED FOR PAPER SIZE OR N-up PRINTING IS DESIGNATED |
| 5 | WATERMARK | DISPLAY/ NON-DISPLAY | · DESIGNATION ON WHETHER TO DISPLAY ALL WATERMARKS DESIGNATED IN BOOK |
| 6 | HEADER AND FOOTER | DISPLAY/ NON-DISPLAY | · DESIGNATION ON WHETHER TO DISPLAY ALL HEADERS AND FOOTERS DESIGNATED IN BOOK |
| 7 | SHEET DISCHARGE METHOD | STAPLING | · DESIGNATED SHEET DISCHARGE METHOD CAN BE SET "OFF" IF STAPLING IS DESIGNATED IN BOOK<br>· DESIGNATION OF SHEET DISCHARGE METHOD IS SET "ON" AS DEFAULT |

FIG.6

| NO | ATTRIBUTE INFORMATION | | APPLICATION |
|---|---|---|---|
| 1 | PAGE ROTATION | | · 0°, 90°, 180°, OR 270° CAN BE DESIGNATED |
| 2 | WATERMARK | DISPLAY/ NON-DISPLAY | · DESIGNATION ON WHETHER TO DISPLAY ALL WATERMARKS DESIGNATED IN BOOK |
| 3 | HEADER AND FOOTER | DISPLAY/ NON-DISPLAY | · DESIGNATION ON WHETHER TO DISPLAY ALL HEADERS AND FOOTERS DESIGNATED IN BOOK |
| 4 | ZOOMING | IN THE RANGE OF 50% - 200% | · ZOOMING CAN BE DESIGNATED AT A RELATIVE RATIO TO 100% SIZE FITTING VIRTUAL LOGICAL PAGE AREA |
| 5 | IMPOSITION | | · 9 PATTERNS ARE PRESET AND ARBITRARY PATTERNS CAN BE DESIGNATED |
| 6 | ANNOTATION | | |
| 7 | Variable ITEM | | |
| 8 | DIVISION OF PAGE | | |

FIG.15

| No | JOB ID | DEVICE NAME | SETTING ATTRIBUTE | PATH TO JDF |
|----|--------|-------------|-------------------|-------------|
| 1 | 5533 | duplo | SADDLE STITCH BINDING | C¥iWPM¥JDF |
| 2 | 21223 | HORIZON i2i | CASE BINDING | C¥iWPM¥JDF |
| 3 | 25505 | duplo | STAPLING (UPPER-LEFT) | C¥iWPM¥JDF |
| 4 | 11256 | HORIZON i2i | CASE BINDING AND THREE-SIDE CUTTING | |
| ⋮ | ⋮ | ⋮ | ⋮ | ⋮ |

FIG.16

| No | JOB ID | DEVICE NAME | SETTING ATTRIBUTE | PATH TO JDF |
|---|---|---|---|---|
| 1 | 5533 | duplo | SADDLE STITCH BINDING | C¥iWPM¥JDF |
| 2 | 21223 | HORIZON i2i | CASE BINDING | C¥iWPM¥JDF |
| 3 | 25505 | duplo | STAPLING (UPPER-LEFT) | C¥iWPM¥JDF |
| 4 | 11256 | HORIZON i2i | CASE BINDING AND THREE-SIDE CUTTING | C¥iWPM¥JDF |
| ⋮ | ⋮ | ⋮ | ⋮ | ⋮ |

FIG.18

```
OUTPUT JDF                                                    [X]
  JOB NAME(J):    152677                                          ─── 1801
  USER NAME(R):   036863                                          ─── 1802
  PRINTER NAME(N): 7000VP            [▼]  [ PROPERTY(P)... ]
1804 ─ ☑ EXECUTE POSTPROCESSING ON NEARLINE FINISHER             ─── 1803
  FIRST FINISHER NAME  Horizon - i2i  [▼]  [ PROPERTY(P)... ]    ─── 1807
1806 ─ [ ADD FINISHER ]                                          ─── 1805
  LIST OF UNAVAILABLE
  FUNCTIONS:        [                                        ]
  ─────────────────────────────────────────────────────────
  OUTPUT METHOD(D): [ 🗎 PRINT                  ▼]
  NUMBER OF COPIES(C):  [ 1 ⇕ ]  [ PRINT NUMBER OF COPIES(M)... ]
     [1 2 3] [1 2 3]    ☑ PRINT BY COPY VOLUME(O)
                        ☐ SHIFT(F)...  UNIT(U)...  [ 1 ⇕ ] VOLUMES (1~9999)
  SHEET DISCHARGE  AUTO/PANEL
  SETTING          PRIORITIZED               [ SHEET DISCHARGE SETTING(I)... ]

☐ EXECUTE VARIABLE PRINTING(V)           [ DESIGNATE RECORD(Y)... ]
  METHOD OF DESIGNATING  [ DOCUMENT (ALL)          ▼]
  PRINTING AREA(T):
                         [                                   ▲]
                         [                                   ▼]
  ─────────────────────────────────────────────────────────
  [ STORE BY JDF/MJD(S)... ]   [   OK   ]   [ CANCEL ]  [ HELP(H) ]
```
             1808

FIG.19

| OUTPUT JDF | ☒ |
|---|---|

JOB NAME(J): 152677
USER NAME(R): 036863
PRINTER NAME(N): 7000VP ▼ [PROPERTY(P)...]
☑ EXECUTE POSTPROCESSING ON NEARLINE FINISHER
FIRST FINISHER NAME: Horizon - i2i ▼ [PROPERTY(P)...]
SECOND FINISHER NAME: ▼ [PROPERTY(P)...] — 1901
THIRD FINISHER NAME: ▼ [PROPERTY(P)...] — 1902
[ADD FINISHER]

LIST OF UNAVAILABLE FUNCTIONS:

OUTPUT METHOD(D): 🖶 PRINT ▼
NUMBER OF COPIES(C): 1 [PRINT NUMBER OF COPIES(M)...]
☑ PRINT BY COPY VOLUME(O)
☐ SHIFT(F)... UNIT(U)... 1 VOLUMES (1~9999)
SHEET DISCHARGE SETTING  AUTO/PANEL PRIORITIZED  [SHEET DISCHARGE SETTING(I)...]

☐ EXECUTE VARIABLE PRINTING(V)  [DESIGNATE RECORD(Y)...]
METHOD OF DESIGNATING PRINTING AREA(T): DOCUMENT (ALL) ▼

[STORE BY JDF/MJD(S)...]  [OK]  [CANCEL]  [HELP(H)]

| OUTPUT JDF | | ☒ |
|---|---|---|
| JOB NAME(J): | 152677 | — 1801 |
| USER NAME(R): | 036863 | — 1802 |

PRINTER NAME(N): 7000VP ▼ [PROPERTY(P)...] — 1803
1804 — ☑ EXECUTE POSTPROCESSING ON NEARLINE FINISHER
2201 — ☑ REGISTER JDF FOR NEARLINE FINISHER

FIRST FINISHER NAME  Horizon - i2i  ▼  [PROPERTY(P)...] — 1805
[ADD FINISHER]

LIST OF UNAVAILABLE
FUNCTIONS:

OUTPUT METHOD(D): 🗐 PRINT ▼
NUMBER OF COPIES(C): 1 ⇳   [PRINT NUMBER OF COPIES(M)...]
   ☑ PRINT BY COPY VOLUME(O)
   ☐ SHIFT(F)... UNIT(U)...   1 ⇳  VOLUMES (1~9999)
SHEET DISCHARGE   AUTO/PANEL
SETTING           PRIORITIZED                    [SHEET DISCHARGE SETTING(I)...]

☐ EXECUTE VARIABLE PRINTING(V)      [DESIGNATE RECORD(Y)...]

METHOD OF DESIGNATING
PRINTING AREA(T):  DOCUMENT (ALL)  ▼

[OK]  [CANCEL]  [HELP(H)]
  └─ 1806

FIG.23 iWPPM OUTPUT RESULT LOG

JOB ID: 152677
PRINTER NAME: imagePRESS7000VP
FINISHER: HORIZON i2i

AUTOMATICALLY CANCELLED SETTINGS:
 1. GLUE AND WRAP WITH COVER
 2. THREE-SIDE CUTTING

| JDF REGISTERED ATTRIBUTE CHANGING SCREEN | | ☒ |
|---|---|---|
| CHANGE PRINTER SETTINGS... | | |
| JOB ID | 11256 | |
| DEVICE NAME | Horizon i2i | CHANGE(C)... |
| SETTING (INSTRUCTION) | CASE BINDING AND THREE-SIDE CUTTING | |
| PATH TO JDF STORING FOLDER | C¥iWPM¥JDF | |

OK    CANCEL    HELP(H)

FIG.26

| | JOB ID | DEVICE NAME | SETTING | PATH TO JDF |
|---|---|---|---|---|
| 2601 ☑ | 11256 | HORIZON i2i | CASE BINDING AND THREE-SIDE CUTTING | C¥iWPM¥JDF |
| ☐ | 21223 | HORIZON i2i | CASE BINDING | C¥iWPM¥JDF |

REGISTERED JDF SELECTION SCREEN

INFORMATION PROCESSING APPARATUS, CONTROL METHOD FOR IMAGE FORMING APPARATUS AND POST-PROCESSING APPARATUS, AND COMPUTER PROGRAM

BACKGROUND OF THE INVENTION

1. Field of the Invention

The present invention relates to a document processing system configured to execute prepress and press processing by using a printer in combination with a plurality of nearline finishers.

2. Description of the Related Art

When a company engaged in the commercial printing business receives an order of a print product (a magazine, a newspaper, a leaflet, an advertisement, or a photogravure) from a third party (a customer or a client), the company produces the print product desired by the client, delivers the final print product to the client, and receives the corresponding fee from the client. Meanwhile, in the commercial printing industry, a large-size printing apparatus, such as an offset type printing machine, is still used as the mainstream.

Under such circumstances, in the commercial printing industry, various processing and operations are executed before acquiring a final print product. More specifically, processing and operations, such as inputting a document, providing a design and a layout, presenting a comprehensive layout (presenting an output by a printer), proofreading (correcting the layout and adjusting color), proof printing, preparing a block copy, printing, post processing, and shipment.

When a printing machine as described above is used, it is always necessary to prepare a block copy. In this regard, it is difficult and disadvantageous in terms of costs to correct or modify a completely prepared block copy because a thorough proofreading including verification of the layout and the color is essentially required in this case.

As described above, in the commercial printing industry, it is necessary to use a large-size apparatus. In addition, it takes sufficiently long time to completely produce a print product desired by a client. Furthermore, professional knowledge is required to execute the above-described processing and operations. In other words, experience and know-how of a craftsman or a skilled labor is required. Japanese Patent Application Laid-Open No. 11-110535 discusses a method for inputting document data or parts data which constitutes a portion of the document, determining the design and the layout, and executing proof printing.

Meanwhile, with the recent increase in a processing speed and an image quality of an electrophotographic type or inkjet type printing apparatus, a print on demand (POD) printing method has become widely used competing with the commercial printing industry using the above-described method. The POD is intended to execute printing without using a large-size apparatus or a complicated system and to deliver a print product in short delivery time by dividing a job executed by a printing apparatus into relatively small lots.

In particular, the POD maximally utilizes a digital image forming apparatus, such as a digital copying machine or a digital multifunction peripheral (MFP), instead of using the above-described large-size printing apparatus or a highly exclusive printing method. Thus, the POD implements digital printing using electronic data. The POD market that utilizes the POD method has been established and become widespread.

In the above-described POD market, digital processing is more often used than in the conventional commercial printing industry, and management and control utilizing a computer has become prevalent. Thus, scale and a technological level of the computerized POD market has increased and improved to approach those of the conventional printing industry.

Under such circumstances, services such as Print For Pay (PFP) service and Centralized Reproduction Department (CRD) service have been provided in the POD market. Here, the PFP printing service is a service provided to a general customer by a copy shop, a print shop, or a printing company, while the CRD service is a service exclusively provided within a corporation.

Recently, in the POD market, various standards have been developed by different industry organizations in order to implement a centralized support of business operations and an efficient business management. For example, the International Cooperation for the Integration of Processes in Prepress, Press and Postpress Organization (CIP4) has set forth the Job Definition Format (JDF) standard. The CIP4 is a cooperative organization aimed at integrating the operation and processing of prepress, press, and postpress.

The JDF has made it easy to centrally manage and automatically execute the print processing beginning from an input of a document by a client to the processing such as prepress, press, and postpress. For example, when a print job is brought into a printer such as a print shop, the print job is managed by a printing system. An operator of the printing system determines what processing is to be executed on the print job in each processing step, such as raster image processor (RIP) processing for generating image data to be printed, print processing for printing an image on a sheet, or binding processing for cutting and binding the printed sheets.

Furthermore, the operator defines content of each processing step by the JDF and transmits the defined processing content to each apparatus that executes processing assigned thereto. After receiving the processing content, each apparatus executes the processing according to the received processing content. Thus, a series of print processing can be centrally managed.

In post-processing for printed sheets, a post-processing apparatus named a finisher, such as a paper folding machine, and a cutting machine, is used. There are three types of such post-processing apparatuses.

One type is a finisher which is directly connected to the printing apparatus. The printed sheets are automatically conveyed into the finisher. The finisher of this type is called an "inline finisher." Another type is a finisher that is not directly connected to the printing apparatus but connected via a network. The finisher of this type is called a "nearline finisher". A nearline finisher requires the operator to convey printed sheets thereto because the printed sheets are not automatically conveyed from the printing apparatus. A yet another type is an "offline finisher" that is not connected to the printing apparatus directly or via the network. Accordingly, the offline finisher itself cannot transmit or receive information to or from the printing apparatus.

In addition to the above-described conventional method, other conventional methods have been discussed by Japanese Patent Application Laid-Open Nos. 2005-101883 and 2001-142667.

As described above, the JDF, as an industry standard, has made it easy to centrally manage and automatically execute the processing beginning from the input of a document by a client to the processing such as prepress, press, and postpress. However, although the JDF is an industry standard format, the JDF may include a setting attribute expanded uniquely by each vendor.

Therefore, if a printing system includes devices of different vendors, it is difficult to totally control all processing by the JDF due to difference in interfaces among vendors. For example, the vendor of a "prepress application" for executing imposition and print setting on a printer during prepress and press processing, and the vendor of a "nearline finisher" which is not connected to the printing apparatus may be different.

In this case, the prepress application may not have detailed information about the interface of the "nearline finisher". Therefore, it is difficult for the prepress application to issue a correct JDF for giving an instruction to the "nearline finisher". Accordingly, an additional operation may be required to execute printing by using a prepress application and a finisher of different vendors.

More specifically, it is necessary for the operator to issue an appropriate JDF to each of the prepress application and the finisher while reading an operation manual to overcome the difference between the interfaces, which requires great care. Further, the above-described problem prevents the total automation of the processing from the prepress to the press by the JDF.

SUMMARY OF THE INVENTION

The present invention is directed to a method for enabling one application to issue an instruction directly to a plurality of devices of different vendors in an environment in which the plurality of devices of different vendors are mixed which can reduce the trouble of an operator.

According to an aspect of the present invention, an information processing apparatus configured to control an image forming apparatus and a post-processing apparatus configured to execute post-processing on a product output by the image forming apparatus includes a registration unit configured to register a job ticket, a searching unit configured to search for a job ticket that can be used for issuing an instruction to the post-processing apparatus from among the job tickets registered by the registration unit, and an instruction unit configured to issue an instruction to the post-processing apparatus by utilizing the job ticket extracted as a result of the search by the searching unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 4A and 4B illustrate an example of a book attribute according to an exemplary embodiment of the present invention.

FIG. 5 illustrates an example of a chapter attribute according to an exemplary embodiment of the present invention.

FIG. 6 illustrates an example of a page attribute according to an exemplary embodiment of the present invention.

FIG. 15 illustrates an example of a JDF registering database (DB) of the document processing system according to an exemplary embodiment of the present invention.

FIG. 16 illustrates an example of a JDF registering DB of the document processing system according to an exemplary embodiment of the present invention.

FIG. 18 illustrates an example of a user interface screen used for executing the JDF output processing in the document processing system according to an exemplary embodiment of the present invention.

FIG. 19 illustrates an example of a user interface screen used for executing JDF output processing in the document processing system according to an exemplary embodiment of the present invention.

FIG. 22 illustrates an example of a user interface screen used for executing JDF registration processing in the document processing system according to an exemplary embodiment of the present invention.

FIG. 23 illustrates an example of an output result in the document processing system according to an exemplary embodiment of the present invention.

FIG. 25 illustrates an example of a user interface screen used for editing a registered JDF attribute in the document processing system according to an exemplary embodiment of the present invention.

FIG. 26 illustrates an example of a user interface screen used for executing JDF output processing in the document processing system according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

In a document processing system according to a first exemplary embodiment of the present invention, a data file generated by a general application is converted by an electronic document writer into an electronic document file. A bookbinding application provides a function for editing the electronic document file.

In the present exemplary embodiment, functions of each of the general application, the electronic document writer, and the bookbinding application are separately provided for clearly describing various functions implemented in the document processing system. However, a package to be provided to a user is not limited to this configuration. The functions implemented in the document processing system can be provided as an application or a graphic engine including a combination thereof.

Figure 1:
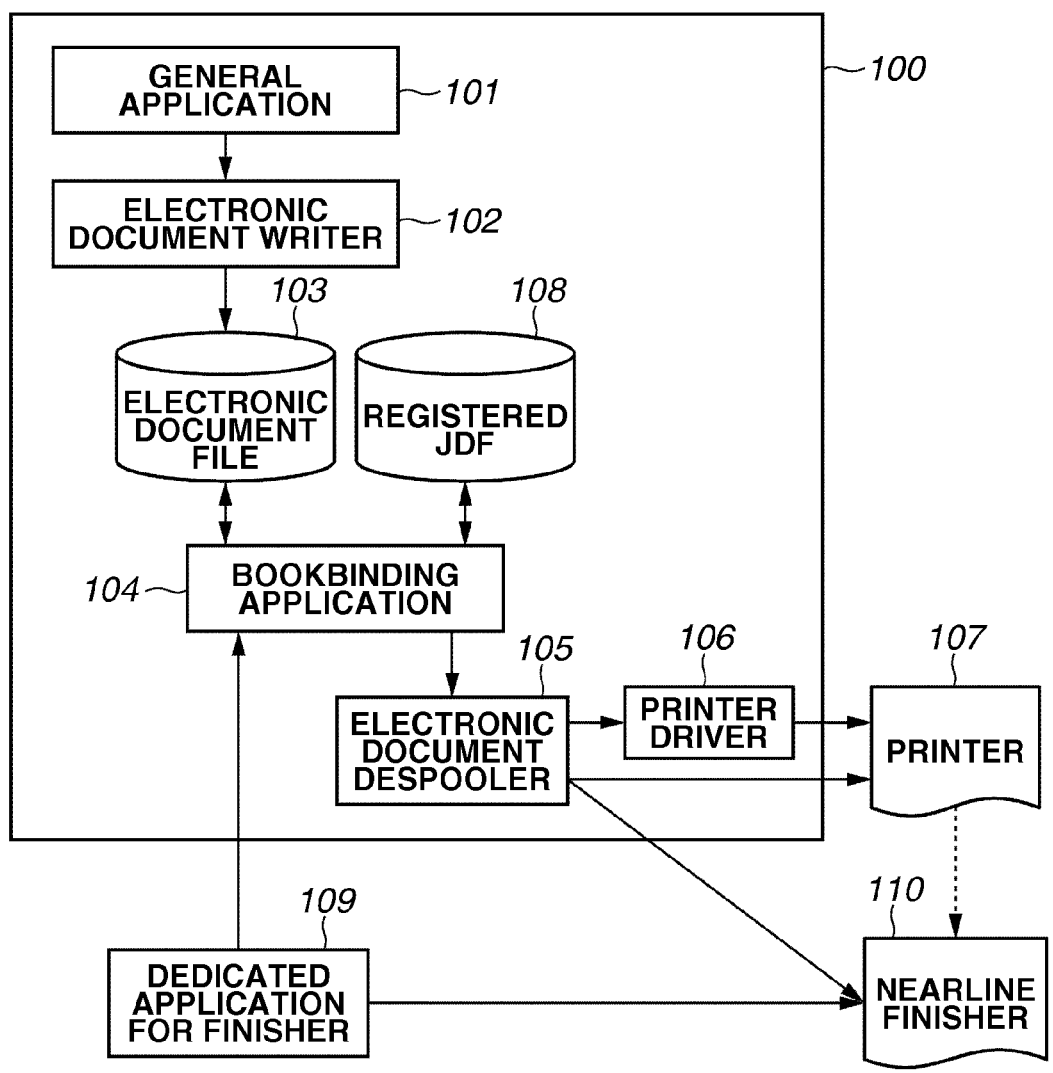
FIG. 1 is a block diagram illustrating an exemplary configuration of a stand-alone type document processing system according to an exemplary embodiment of the present invention.

FIG. 1 illustrates an exemplary software configuration of the document processing system according to the present exemplary embodiment. The document processing system includes prepress, printing, and finishing processing executed in print processing.

Referring to FIG. 1, the document processing system is implemented by a computer 100 (hereinafter also referred to as a "host computer") which is an example of a document processing apparatus (information processing apparatus) of the present invention.

A general application 101 is an application program that provides various functions, such as a word processing function, a spreadsheet function, a photo retouch function, a draw or paint function, a presentation function, and a text editing function. The general application 101 has a printing function for an operating system (OS) that operates on the computer 100.

In printing application data, such as generated document data or image data, the general application 101 utilizes a predetermined interface (a graphic device interface (GDI)) which is provided by the OS.

More specifically, an arbitrary general application 101 transmits an output command (a "GDI function") of a predetermined format dependent on the OS to an output module (not illustrated) of the OS that provides a predetermined interface to print the generated data. After receiving the output command, the output module converts the output command into a format that an output device, such as a printer, can process. Then, the output module outputs the converted command (a device driver interface (DDI) function).

The format that the output device can process may be different according to a type, manufacturer, and a model of the device. Accordingly, a unique device driver for controlling the device is provided to each device.

The OS uses the device driver to convert the command, generates print data, and describes it in a job language (JL) to generate a print job. When Windows® of Microsoft Corporation is used as the OS, a module called GDI corresponds to the output module described above.

An electronic document writer 102 is an improvement of the above-described device driver. The electronic document writer 102 is a software module provided to realize the present document processing system. However, the electronic document writer 102 does not target a specific output device but instead converts the output command into a command of a format that can be processed by a bookbinding application 104 and a printer driver 106. The bookbinding application 104 and the printer driver 106 will be described in detail below.

The format after the conversion (hereinafter referred to as an "electronic document format") by the electronic document writer 102 may be any format only if each document page can be expressed in a detailed form. Among substantial standard formats, the portable document format (PDF) format of Adobe Systems, Inc. and the scalable vector graphics (SVG) format provided by World Wide Web Consortium (W3C), for example, can be employed as the electronic document format.

When the electronic document writer 102 is utilized by the general applications 101, the electronic document writer 102 is designated as a device driver to be used for output before executing printing. However, an electronic document file just generated by the electronic document writer 102 does not have a complete format as an electronic document file.

Therefore, the bookbinding application 104 designates the electronic document writer 102 as a device driver. Application data is converted into an electronic document file under control of the bookbinding application 104. The bookbinding application 104 completes a new and incomplete electronic document file generated by the electronic document writer 102 as an electronic document file having a format to be described later.

Hereinbelow, a file generated by the electronic document writer 102 is referred to as an "electronic document file" and an electronic document file that has been given a structure by the bookbinding application 104 is referred to as a "book file" when it is necessary to distinguish between them. On the other hand, if it is not particularly necessary to distinguish among a document file generated by an application, an electronic document file, and a book file, the file is collectively referred to as a "document file" (or "document data").

As described above, the electronic document writer 102 is designated as the device driver and the general application 101 prints the application data. Thus, the application data is converted into an electronic document format in the unit of a page defined by the general application 101 (hereinafter referred to as a "logical page" or a "document page").

The application data of the electronic document format is stored on a storage medium such as a hard disk as an electronic document file 103. As the hard disk, a local drive included in a computer that implements the document processing system according to the present exemplary embodiment can be used. Alternatively, if communication via a network is available, a drive provided on the network can be used as the hard disk.

If the general application 101 itself has a capacity to generate data in the electronic document format, it is not necessary to designate the electronic document writer 102 as the device driver before printing. In this case, the general application 101 can convert application data into the electronic document format which is generated by the general application 101 itself into an electronic document file under control of the bookbinding application 104.

The bookbinding application 104 provides the user with a function for reading the electronic document file (book file) 103 and editing the read book file 103. In printing the book file 103 that has been edited by the bookbinding application 104, the bookbinding application 104 activates an electronic document despooler 105.

The electronic document despooler 105 is a program module installed in a computer together with the bookbinding application 104. Further, the electronic document despooler 105 is a module used for outputting drawing data to the printer driver 106 and a printer 107 when a document (book file) utilized by the bookbinding application 104 is printed.

The electronic document despooler 105 reads a designated book file 103 from the hard disk. Further, the electronic document despooler 105 generates an output command compliant with the output module of the OS to print each page in the format described in the read book file 103 and outputs the generated output command to the output module. In outputting the output command to the output module, the printer driver 106 of the printer 107 which is used as an output device is designated as a device driver.

The output module converts the output command received by using the designated printer driver 106 of the printer 107 into a device command that the printer 107 can interpret and execute. Then, the device command is transmitted to the printer 107. The printer 107 prints an image according to the received device command on a print sheet.

A finisher dedicated application 109 is an application provided dedicatedly to a nearline finisher (post-processing apparatus) 110 which executes post-processing on a product output by the printer 107. The finisher dedicated application 109 generates a job ticket for controlling the nearline finisher 110 according to a user instruction and issues the generated job ticket to the nearline finisher 110.

In FIG. 1, the finisher dedicated application 109 is installed on a computer different from the computer 100 on which the bookbinding application 104, the general application 101, or the like are installed. However, the finisher dedicated application 109 can be installed within the computer 100.

Figure 2:
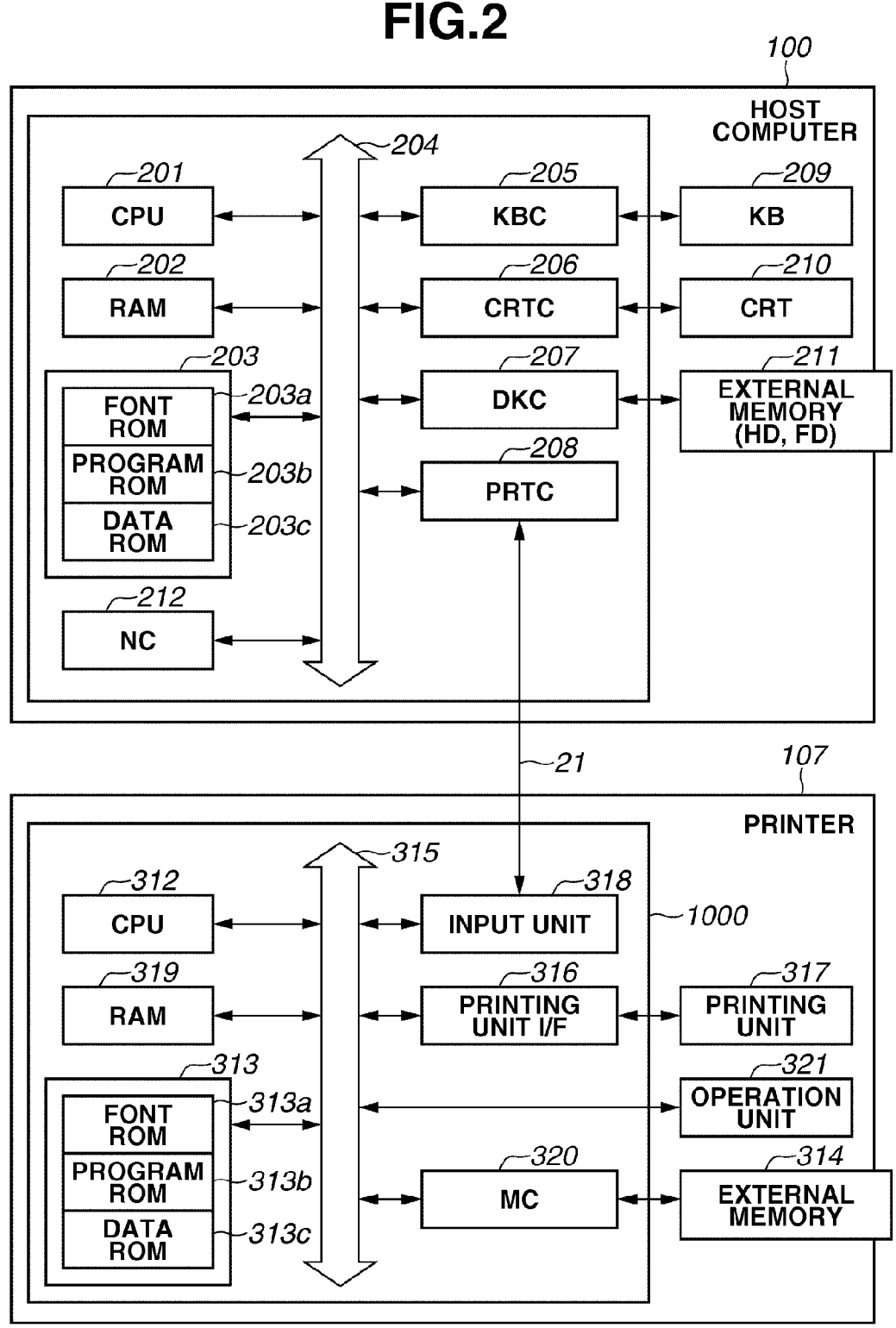
FIG. 2 a block diagram illustrating an exemplary configuration of a host computer of the document processing system according to an exemplary embodiment of the present invention.

FIG. 2 illustrates an exemplary hardware configuration of the document processing system according to the present exemplary embodiment.

Referring to FIG. 2, the host computer 100 includes a central processing unit (CPU) 201. The CPU 201 executes processing according to a program, such as a document processing program (application program) stored on a program read-only memory (ROM) 203b of a ROM 203 or the external memory 211 or a print processing-related program. The processing executed by the CPU 201 includes processing of a document which mixedly includes components, such as a diagram, an image, a character, or a table (including a spreadsheet). Further, the CPU 201 controls an entire operation of devices connected to a system bus 204 of the host computer 100.

The program ROM 203b of the ROM 203 or the external memory 211 stores a basic input output system (BIOS) and a program, such as an operating system program (hereinafter simply referred to as an "OS") which is a control program for the CPU 201. A font ROM 203a of the ROM 203 or the external memory 211 stores data, such as font data which is used in processing a document. A data ROM 203c of the ROM 203 or the external memory 211 stores various data used in executing various processing, such as the document processing.

A random access memory (RAM) 202 functions as a main memory and a work area of the CPU 201. A keyboard controller (KBC) 205 controls a key input from a keyboard (KB) 209 and a command input from a pointing device (not illustrated). A cathode ray tube (CRT) controller (CRTC) 206 controls display on a CRT display (CRT) 210. A liquid crystal display (LCD) controller and an LCD can be used instead of the CRTC 206 and the CRT display 210.

A disk controller (DKC) 207 controls access to/from the external memory 211 such as a hard disk (HD) and a floppy disk (FD). The external memory 211 stores various programs and data, such as a boot program, various applications, font data, a user file, a file to be edited, and a print control command generation program (hereinafter referred to as a "printer driver").

A printer controller (PRTC) 208 is connected to the printer 107 via a predetermined interactive interface 21 and controls a communication with the printer 107. A universal serial bus (USB) interface, an Institute of Electrical and Electronic Engineers (IEEE) 1394 interface, or a wireless local area network (LAN) interface can be used as the interactive interface.

The CPU 201 rasterizes an outline font on a display information RAM which is provided on the RAM 202 to provide a graphic user interface (GUI). Thus, "what you see is what you get" (WYSIWIG) on the CRT 210 is implemented. In addition, the CPU 201 opens various registered windows according to a command issued by a user by using a mouse cursor (not illustrated) on the CRT 210 to execute various data processing. In executing printing, the user opens a window (operation screen) for performing a print setting and can execute settings of the printer 107 and a printing method for the printer driver including selection of a print mode.

The printer (printing apparatus) 107 includes a printer CPU 312. The printer CPU 312 controls the entire operation of devices connected to a system bus 315 of a printer control unit 1000. In addition, the printer CPU 312 outputs an image signal (output information) to a printing unit (printer engine) 317 via a printing unit interface (I/F) 316. The output is executed based on a program, such as a control program stored on a program ROM 313b of a ROM 313 or an external memory 314.

The program ROM 313b of the ROM 313 stores a program, such as a control program for the printer CPU 312. A font ROM 313a of the ROM 313 stores the data such as font data for generating the above-described output information. When a printer that does not include an external memory 314 such as an HD or an integrated circuit (IC) card is used, a data ROM 313c of the ROM 313 stores information utilized by the host computer 100.

The printer CPU 312 can communicate with the host computer 100 via an input unit 318. The printer CPU 312 can notify various information, such as status information about the printer 107, to the host computer 100.

A RAM 319 functions as a main memory and a work area of the printer CPU 312. A memory capacity of the RAM 319 can be expanded with an optional RAM which can be connected to an expansion port (not illustrated). The RAM 319 is used as an output information rasterization area, an environmental data storage area, and a non-volatile random access memory (NVRAM).

Access to/from the external memory 314 is controlled by a memory controller (MC) 320. The external memory 314 which is connected as an optional memory stores the font data, an emulation program, form data, or the like. An operation unit 321 includes components, such as an operation panel and a switch which implement various operations on the printer 107, and a light-emitting diode (LED) indicator.

A number of the external memories 314 is not limited to one. More specifically, at least one external memory 314 may be provided and a plurality of optional font cards, in addition to the built-in font, and a plurality of external memories storing a program for interpreting a printer control language (PCL) of different language systems can be connected. In addition, an NVRAM (not illustrated) may be provided to store printer mode setting information from the operation unit 321.

Before describing the details of the bookbinding application 104, a data format of a book file is described at first.

A book file has a 3-layer structure as a book made of paper sheets. More specifically, a top layer "book" corresponds to one book, and includes a definition of an attribute of the entire document. An intermediate layer "chapter" corresponds to a chapter of a paper book. Each "chapter" includes a definition of an attribute of each thereof. A bottom layer "page" corresponds to each page defined by the application program. Each page can include an attribute of each page.

One book can include a plurality of chapters, while one chapter can include a plurality of pages.

Figure 3:
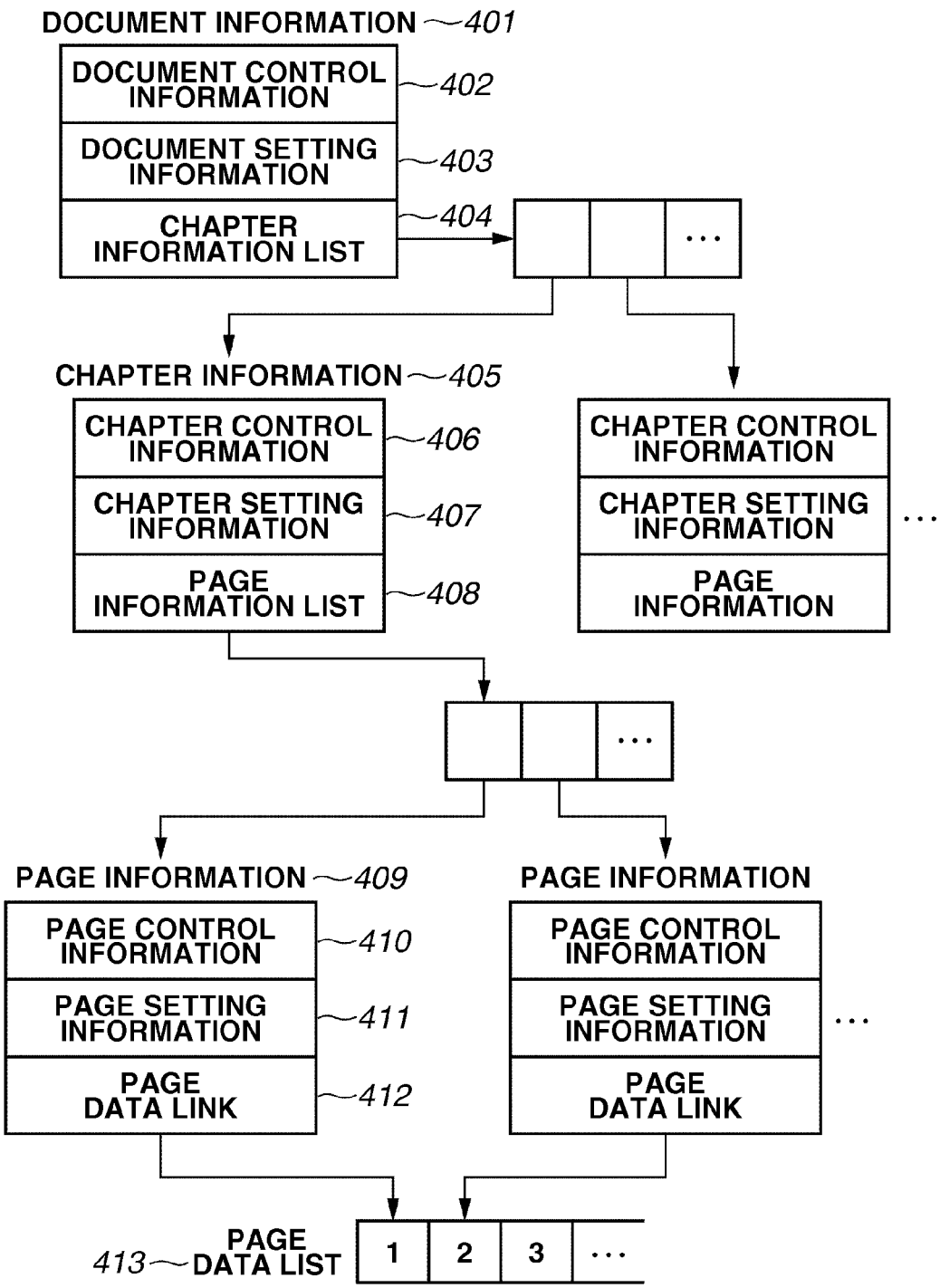
FIG. 3 illustrates an exemplary structure of a book file according to an exemplary embodiment of the present invention.

FIG. 3 illustrates an exemplary data format of a book file according to the present exemplary embodiment. Each of a book, chapter, and page of the book file illustrated in FIG. 3 is indicated with a node corresponding thereto. One book file includes one book. A book and a chapter are concepts that define the structure of the book. Accordingly, a book and a chapter include a defined attribute value and a link to a lower layer as an entity thereof.

A page includes data of each page output by the application program as its entity. Accordingly, a page includes its attribute value, the entity of a page of a document (hereinafter referred to as a "document page data" or "document data") and a link to each document page data.

A printed page to be output on a print sheet such as a paper medium may include a plurality of document pages. This structure is not indicated by the link but indicated as an attribute of each layer of book, chapter, and page.

In the example illustrated in FIG. 3, a "book" is described as a "document" in general because it is not necessary that a book file is one integrated book.

Referring to FIG. 3, a document includes document information 401 on its top layer. The document information 401 includes three broad portions 402 through 404. Document control information 402 stores information such as a path name in a file system of a document file. Document setting information 403 stores layout information such as a page layout and setting information about a function of the printing apparatus such as a stapling function.

The document setting information 403 corresponds to an attribute of a book. A chapter information list 404 stores an aggregate of chapters constituting a document as a list. The list stores chapter information 405. The chapter information 405 includes three broad portions 406 through 408.

Chapter control information 406 stores information about a name of a chapter. Chapter setting information 407 stores information about a page layout and stapling which are set uniquely to the chapter. The chapter setting information 407 corresponds to an attribute of a chapter.

As described above, each chapter includes the chapter setting information 407. Accordingly, a document having an intricate layout whose first chapter has a 2-up layout while whose other chapters have a 4-up layout, for example, can be generated.

A page information list 408 stores an aggregate of document pages constituting each chapter as a list. The page information list 408 includes page information data 409. The page information data 409 includes three broad portions 410 through 412.

Page control information 410 stores information such as a page number indicated with a tree structure. Page setting information 411 stores information such as page rotational angle and page layout information. The page setting information 411 corresponds to an attribute of a document page.

Page data link information 412 is document data corresponding to a page. In the example illustrated in FIG. 3, the page information 409 does not directly include the document data but include the page data link information 412 only. The actual document data is stored in the page data list 413.

FIGS. 4A and 4B illustrate an example of a book attribute (the document setting information 403) according to the present exemplary embodiment.

In general, an item that can be defined in duplication with a lower layer, an attribute value of the lower layer is prioritized over its upper layer. Accordingly, an item that is included only in a book attribute, a value defined in the book attribute becomes valid for the entire book.

On the other hand, the item that can be defined in duplication with a lower layer can be used as a default value of a case where no definition is provided in the lower layer. In the present exemplary embodiment, it can be selected whether to prioritize the attribute value of the lower layer.

In the example illustrated in FIGS. 4A and 4B, each item does not necessarily correspond to only one setting item. That is, an item can include a plurality of related setting items.

Referring to FIGS. 4A and 4B, the following fourteen items can be included in a book attribute as unique items, namely, "printing method", "finishing size", "layout method", "register mark and bleed", "binding margin/binding orientation", "bookbinding details", "front cover/back cover", "index sheet", "inserted sheet", "chapter break", "finishing", "case binding cover size", "magnification/reduction in finishing", and "magnification/reduction of bleed". The items can be defined in a book.

For the attribute "printing method", a value of three setting items, namely, "one-sided printing", "two-sided printing", and "bookbinding printing", can be designated. For the attribute "finishing size", a value of two setting items, namely, "fixed size" and "user-designated size", can be designated. The finishing size attribute indicates a size of a final print product acquired after cutting the print sheets of a size designated in a setting item "paper size".

In the present invention, the finishing size can be set separately from the paper size. The finishing size is set equal to or smaller than the paper size. If a specific printing method is designated in which it is necessary to set the finishing size, the paper size is defined only in the book attribute and cannot be set in a chapter attribute. The chapter attribute will be described in detail later below.

The attribute "layout method" designates a layout method when the user desires to impose and print a plurality of pages on one output sheet on the premise that the output sheet is cut and bound into a book by using an inline finisher or an offline finisher. Setting items such as "leaf", "saddle stitch binding", "case binding", or "fourfold" can be designated as the layout method.

The attribute "leaf" indicates a method of imposing a page to be printed with a layout for binding the printed sheet without folding it at the time of finishing. The setting item "saddle stitch binding" refers to a method for imposing the page to be printed on a sheet with a layout that enables the binding of the printed sheets by folding a bundle of a separately designated number of printed sheets into two and binding the two-folded sheet bundle.

The attribute "case binding" refers to a method for imposing the page to be printed on a case binding cover and a text sheet with a layout that enables case binding by an inline finisher or an offline finisher. Further, the "case binding" refers to a method for binding in which the printed text sheets are glued at binding positions and covered with a case binding cover, and the case-bound sheet bundle is cut at three sides thereof if necessary.

The attribute "fourfold" refers to a method for imposing the page to be printed with a layout that enables perfect binding of a bundle of four-folded output sheets. The perfect binding is implemented by cutting the output sheets at three or four sides by an offline finisher.

The attribute "register mark/bleed" designates printing of a register mark and bleed (cutting margin) on the page to be printed in printing an electronic document file. A bleed area (width of cutting margin) can be provided for each side of a finishing page. The bleed area indicates the width to be cut off from the printed sheets. The register mark (cutting line mark) indicates the line of cutting when the user desires to cut the printed sheet with the offline finisher.

In the attribute "binding margin/binding orientation", the binding orientation of a document can be selected from among alternatives such as "longer side binding (left)", "longer side binding (right)", "shorter side binding (top)", and "shorter side binding (bottom)" if the sheet is oriented in the portrait orientation. On the other hand, the binding orientation of a document can be selected from among alternatives such as "longer side binding (top)", "longer side binding (bottom)", "shorter side binding (left)", and "shorter side binding (right)" if the sheet is oriented in the landscape orientation. The attribute "binding margin" refers to the width of the margin provided on the side of the designated binding orientation.

With respect to the attribute "bookbinding details", if the layout method such as "saddle stitch binding", "case binding", or "fourfold" is designated, then an item such as the direction of opening, the number of sheets of a bundle, the binding margin (width), and a gutter shift can be designated.

The attribute "front cover/back cover" includes designation of using a front/back cover sheet and the content to be printed on the cover sheet in the case of printing an electronic document file to be bound into a book.

The attribute "index sheet" includes designation of inserting a tabbed index sheet as a chapter break, which is separately set on the printing apparatus, and designation of the content to be printed on the index portion (tab). The attribute "index sheet" becomes enabled if an inserter having a function for inserting a sheet provided separately from the printing sheet at a desired position of a sheet bundle is provided to the printing apparatus or if a plurality of sheet feed cassettes can be used. The same applies to the attribute "inserted sheet".

The attribute "inserted sheet" includes designation of inserting a sheet supplied from the inserter or the sheet feed cassette as a chapter break. Further, if it is designated to insert such a sheet, the attribute "inserted sheet" can include designation of a sheet feed source.

The attribute "chapter break" can designate, for a chapter break, whether to use a new sheet, whether to use a new page to be printed, or whether not to apply a particular operation for the chapter break. In the case of one-sided printing, the chapter break is set in the same format regardless of whether a new sheet or a new page to be printed is designated. On the other hand, in the case of two-sided printing, if it is designated to use a new sheet for a chapter break, different two consecutive chapters are not printed on a same sheet while if it is designated to use a new page to be printed for a chapter break, different two consecutive chapters may be printed on the front side and the back side of one sheet, respectively.

The attribute "finishing" designates whether to execute processing such as saddle stitch binding, case binding processing, or three-side cutting on a discharged sheet. The attribute "finishing" becomes enabled if the printing apparatus to be used has the finishing function.

The attribute "case binding cover paper size" refers to the paper size that can be set if "case binding" is set as the layout method and denotes the size of the sheet for covering the text sheet bundle.

The above-described finishing size refers to the finishing size of the text sheet. Accordingly, the present exemplary embodiment does not particularly store the finishing size of the case binding cover sheet as an attribute because the case binding cover sheet finishing size can be automatically determined based on the finishing size of the text sheet. As in the case of the text sheet, the size of the case binding cover sheet is set larger than the finishing size of the case binding cover.

The finishing size of the case binding cover is calculated by the following expression:

$$\text{Text sheet finishing size} \times 2 + \text{spine width}$$

The above expression is based on the finishing size of the case binding cover sheet that is equivalent to the sum of the sizes of the front and the back covers and the spine width and that in the present exemplary embodiment, both the front cover sheet size and the back cover sheet size is equivalent to the text sheet finishing size. The spine width can be calculated by product of a thickness of the text sheet which may differ according to a type of the text sheet (medium) to be used and a total number of text sheets of a book sheet bundle.

If a parameter value "ON" is set for the attribute "magnification/reduction in finishing", it is indicated that the input document page is to be magnified or reduced according to the finishing paper size. If the parameter value "ON" is set for the attribute "magnification/reduction of bleed", it is indicated that the input document page is to be magnified or reduced according to the size including the size of the bleed areas each of which is set for each of the four sides of the sheet in the finishing paper size.

FIG. 5 illustrates an example of a chapter attribute (the chapter setting information 407) according to the present exemplary embodiment. FIG. 6 illustrates an example of a page attribute (the page setting information 411) according to the present exemplary embodiment. The relationship between the chapter attribute and the page attribute is similar to the relationship between the book attribute and an attribute of a lower layer.

In the chapter attribute, no item unique to a chapter is defined and all items are the same as those defined in the book attribute. Accordingly, if the definition in the chapter attribute differs from the definition in the book attribute, then the parameter value defined in the chapter attribute is generally prioritized and used. However, in the present exemplary embodiment, it can be selected whether to prioritize the attribute value defined in the lower layer.

Only five items, such as the paper size, the paper orientation, designation of N-up printing, magnification/reduction, and a sheet discharge method, are defined in common to the book attribute and the chapter attribute. Among the five common items, the paper size refers to the size of the printing sheet as described above. If the case binding or twofold binding (equivalent to the above-described binding printing) is not selected, a different paper size can be defined for each chapter.

The attribute "paper orientation" defines an orientation of the sheet, namely, portrait (longitudinal) or landscape (latitudinal).

The attribute "N-up printing" designates the number of document pages to be printed on one page. For the type of the N-up layout, "1×1", "1×2", "2×2", "3×3", or "4×4", for example, can be designated. If the parameter value "ON" is set for the attribute "magnification/reduction", it is indicated that the input document page is to be magnified or reduced according to the size of the output sheet.

The attribute "sheet discharge method" designates whether to execute stapling on the discharged sheet. The attribute "sheet discharge method" becomes enabled if the printing apparatus to be used includes the stapling function.

The attributes such as "page rotation", "zooming", "imposition", "annotation", "page division", or the like can be defined uniquely to the page attribute. The attribute "page rotation" designates the rotational angle of a page when a document page is imposed on a page to be printed. The attribute "zooming" designates a zooming (magnification) ratio of the document page. The zooming ratio is a ratio of the size of the document page to the size of a virtual logical page area (100%).

A virtual logical page area refers to an area of one document page when the document page is imposed according to the layout designation such as N-up printing. For example, if the imposition "1×1" is designated, the virtual logical page area corresponds to the area of one printing page. On the other hand, if the imposition "1×2" is designated, the virtual logical page area corresponds to the area of one printing page whose each side is reduced to 70% of its original size.

The attributes "watermark" and "header/footer" are defined in common to the book, the chapter, and the page attributes. A "watermark" refers to information such as an image or a character string which is designated separately from image data generated by an application and is printed in superimposition therewith.

Each of a header and footer is a watermark printed in an upper margin or a lower margin of each page. An item that can be designated by a variable, namely, information such as a page number or date and time, is provided to the header and the footer.

The contents that can be designated in the watermark attribute and the header/footer attribute are the same in the chapter attribute and the page attribute, but are different in the book attribute.

In the book attribute, the content of the watermark and the header and footer can be designated. In addition, in the book attribute, a method for printing the watermark and the header and footer can be designated in the entire book. On the other hand, in the chapter attribute and the page attribute, it can be designated whether to print the watermark or the header and footer set in the book attribute in the corresponding chapter or page. A book file includes the above-described configuration and content.

Exemplary processing for generating a book file executed by the bookbinding application 104 and the electronic document writer 102 will be described in detail below. The book file generation processing is implemented as a part of an operation of the bookbinding application 104 for editing a book file.

Figure 7:
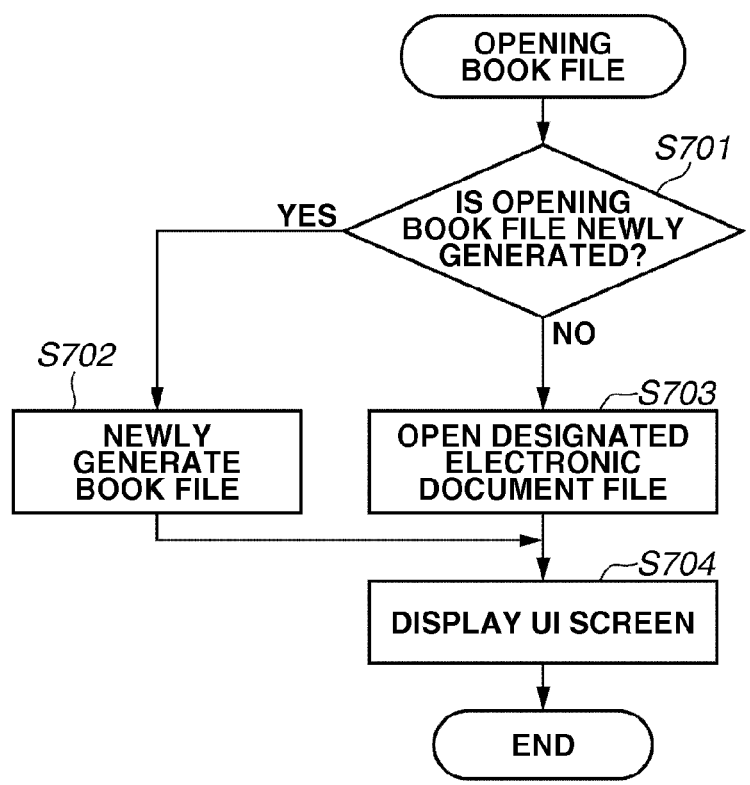
FIG. 7 is a flow chart illustrating exemplary processing for opening a book file according to an exemplary embodiment of the present invention.

FIG. 7 is a flow chart illustrating an example of processing executed by the bookbinding application 104 for generating a book file according to the present exemplary embodiment.

Referring to FIG. 7, in step S701, the bookbinding application 104 determines whether the book file to be opened is a book file to be newly generated. If it is determined that the book file to be opened is a book file to be newly generated (YES in step S701), then the processing advances to step S702. In step S702, the bookbinding application 104 generates a new book file that does not include a chapter.

In the example illustrated in FIG. 3, the book file to be newly generated includes the document information 401 only. More specifically, the document information 401 is a node of a book in which no link to a node of a chapter exists. For the book attribute (the document setting information 403), a set of attributes previously determined to be newly generated are applied.

In step S704, the bookbinding application 104 displays a user interface (UI) screen for editing the new book file.

Figure 8:
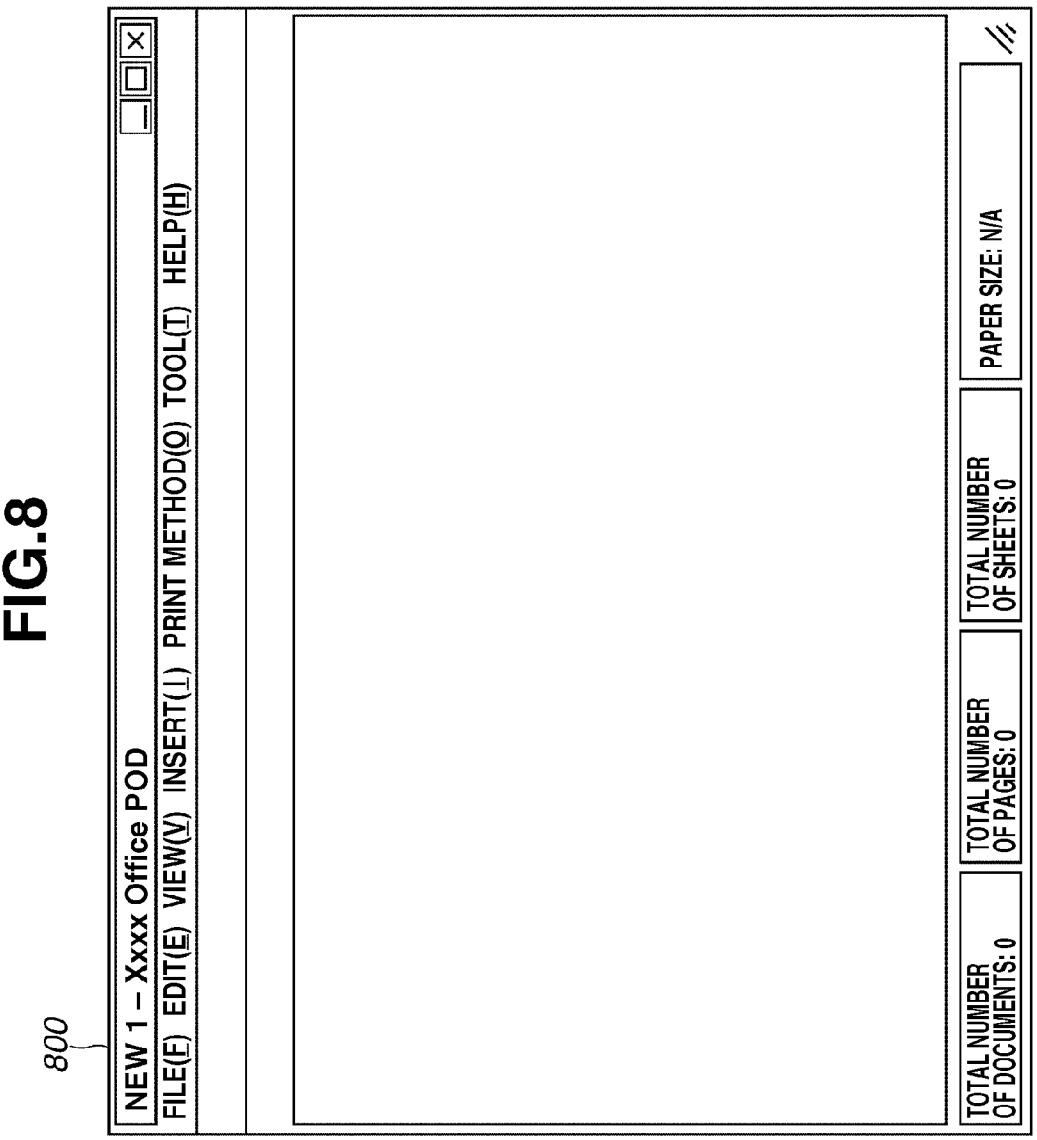
FIG. 8 illustrates an example of a user interface screen displayed when a new book file is opened according to an exemplary embodiment of the present invention.

FIG. 8 illustrates an example of a UI screen 800 which is displayed when a book file is newly generated according to the present exemplary embodiment. In the example illustrated in FIG. 8, the book file does not have any substantial content. Accordingly, no information is displayed on the UI screen 800.

On the other hand, if it is determined that the book file to be opened is an existing book file (NO in step S701), then the processing advances to step S703. In step S703, the bookbinding application 104 opens the designated book file.

Figure 9:
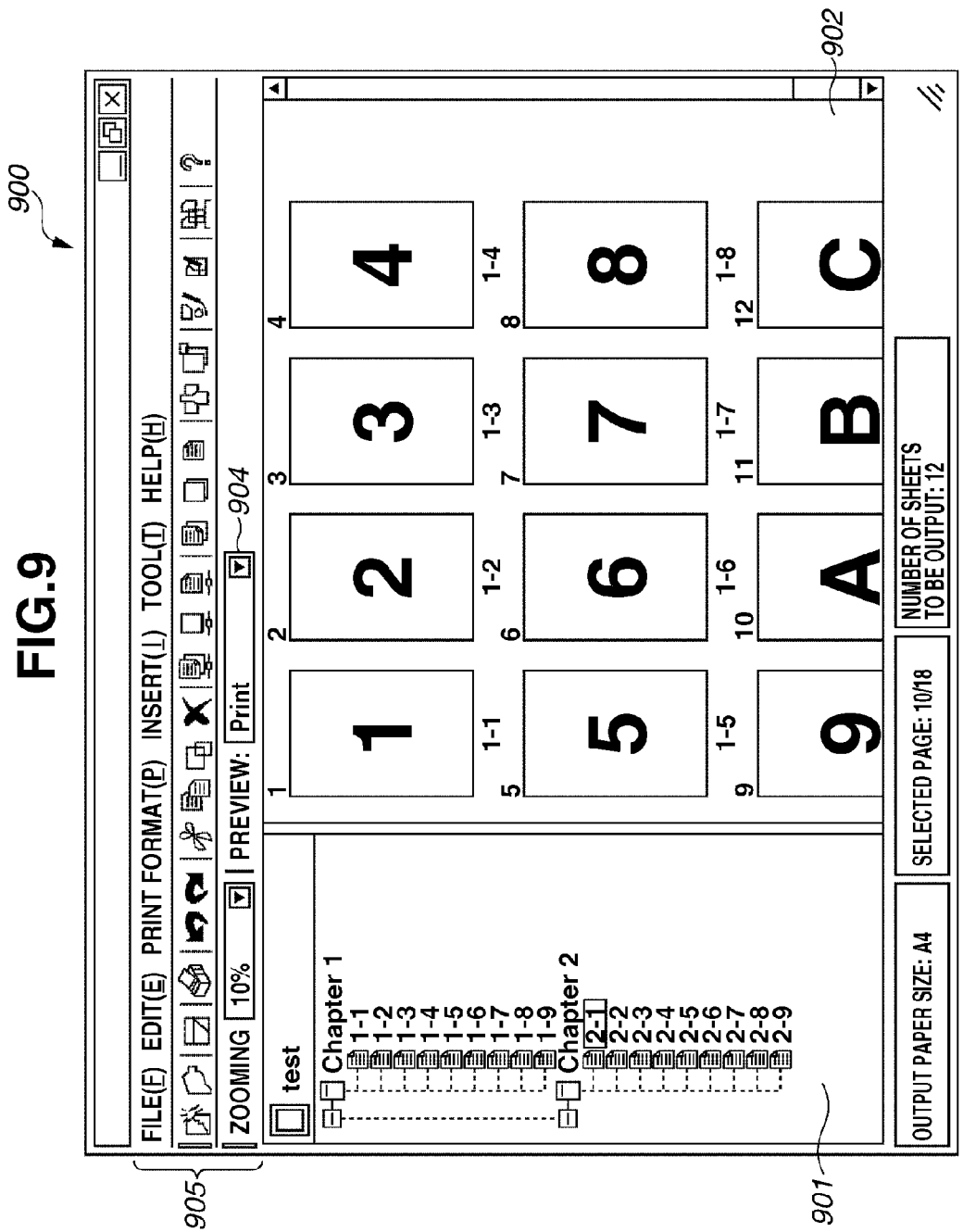
FIG. 9 illustrates an example of a user interface screen displayed when an existing book file is opened according to an exemplary embodiment of the present invention.

Then, the bookbinding application 104 displays an UI screen 900 according to the structure, the attribute, and the content of the book file as illustrated in FIG. 9.

The UI screen 900 will be described in detail below with reference to FIG. 9.

FIG. 9 illustrates an example of the UI screen 900 displayed by the case binding application 104 according to the present exemplary embodiment.

Referring to FIG. 9, the UI screen 900 includes a tree structure field 901 and a preview field 902. The tree structure field 901 indicates the structure of the book. The preview field 902 displays appearance of the sheet to be printed.

More specifically, the tree structure field 901 displays a chapter of a book and a page of each chapter in a tree-like structure similar to the tree structure illustrated in FIG. 3. In FIG. 9, a document page is displayed in the tree structure field 901. The preview field 902 displays the content of a page to be printed as a reduced image (reduced image display). An order of displaying the images is determined according to the structure of the book.

The bookbinding application 104 can add a new chapter to the opened book file. More specifically, the bookbinding application 104 adds application data converted by the electronic document writer 102 into an electronic document file of the book file as a new chapter. This function is referred to as an "electronic document importing function".

The bookbinding application 104 can provide an entity to the new book file generated according to the processing illustrated in FIG. 7 by executing the electronic document importing function thereon. This function can be executed when the user drag-and-drops the application data on the screen illustrated in FIG. 8 or FIG. 9.

The electronic document importing processing will be described in detail below with reference to FIG. 10.

Figure 10:
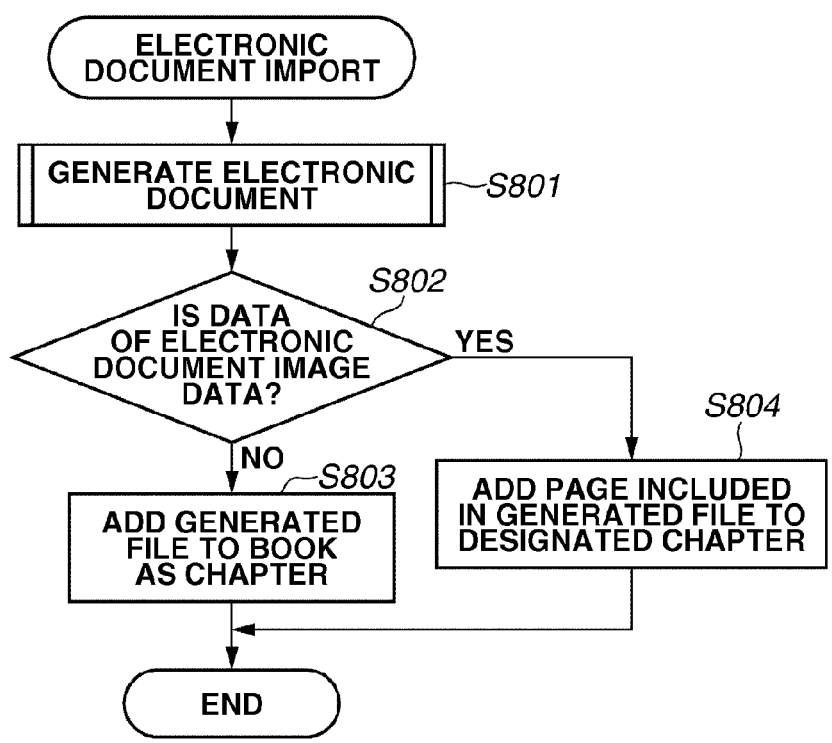
FIG. 10 is a flow chart illustrating exemplary processing for importing an electronic document file in a book file according to an exemplary embodiment of the present invention.

FIG. 10 is a flow chart illustrating exemplary processing for importing an electronic document file according to the present exemplary embodiment.

Referring to FIG. 10, in step S801, the bookbinding application 104 activates the application program that has generated the designated application data. Further, the bookbinding application 104 designates the electronic document writer 102 as the device driver. Moreover, the bookbinding application 104 converts the application data into electronic document data by printing and outputting the application data by the electronic document writer 102.

When the application data is completely converted into the electronic document data, the processing advances to step S802. In step S802, the bookbinding application 104 determines whether the converted electronic document data is image data. If a Windows® OS is used, the determination in step S802 can be executed according to a file extension of the application data.

For example, if the file extension is ".bmp", the converted electronic document data can be determined as bitmap data. If the file extension is ".jpg", then the converted electronic document data can be determined as Joint Photographic Experts Group (JPEG) image data. Further, if the file extension is ".tiff", then the converted electronic document data can be determined as tagged image file format (tiff) image data.

If the converted electronic document data is either of the above-described image data, then an electronic document file can be directly generated based on the image data without activating the application program. Accordingly, in this case, the processing in step S801 can be omitted.

If it is determined that the converted electronic document data is not image data (NO in step S802), then the processing advances to step S803. In step S803, the bookbinding application 104 adds the generated electronic document file to the book of the currently opened book file as a new chapter.

Generally, the value of the book attribute is provided to a chapter attribute that is the same with the book attribute. Furthermore, a predetermined value is set to each of the other chapter attributes. In the present exemplary embodiment, it can be selected whether to prioritize the attribute value of a lower layer as will be described below.

On the other hand, if it is determined that the converted electronic document data is image data (YES in step S802), then the processing advances to step S804. In step S804, the bookbinding application 104, basically, does not add a new chapter and adds each document page included in the generated electronic document file to the designated chapter.

However, if the book file is a newly generated file, a new chapter is generated and the bookbinding application 104 adds each page of the electronic document file to the newly generated chapter as pages thereof.

A page attribute that is the same with the attribute of an upper layer is generally provided with the attribute value of the upper layer. On the other hand, the page attribute that has been defined in the application data and included in the electronic document file, the value of the page attribute defined in the application data is provided thereto. If N-up printing, for example, is designated in the application data, the attribute value of the designated N-up printing is provided to the electronic document file.

A new book file is generated or a new chapter is added in the above-described manner. However, in the present exemplary embodiment, it can be selected whether to prioritize the attribute value defined in the lower layer as will be described in detail below.

The processing executed in step S801 will be described in detail below with reference to FIG. 11.

Figure 11:
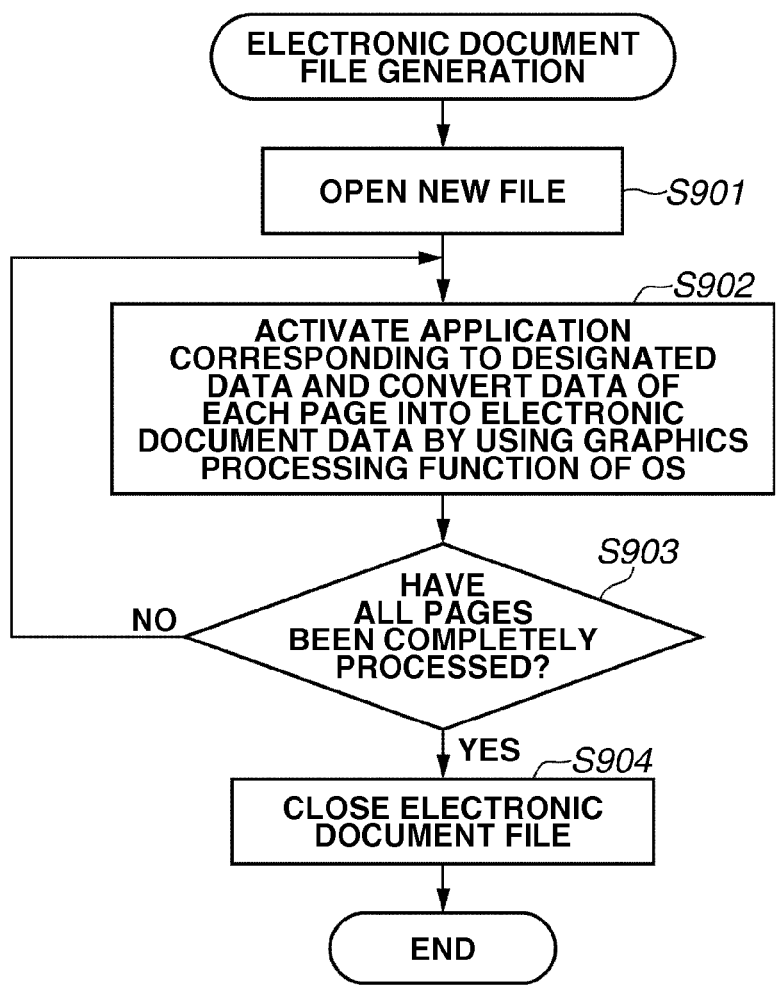
FIG. 11 is a flow chart illustrating exemplary processing for converting application data into an electronic document file according to an exemplary embodiment of the present invention.

FIG. 11 is a flow chart illustrating exemplary processing for generating an electronic document file executed in step S801 according to the present exemplary embodiment.

Referring to FIG. 11, in step S901, the bookbinding application 104 generates a new electronic document file and opens the newly generated electronic document file.

In step S902, the bookbinding application 104 activates an application program corresponding to the designated application data. In addition, the bookbinding application 104 uses the electronic document writer 102 as the device driver and transmits an output command to the output module of the OS.

Furthermore, in step S902, the output module converts the received output command into data of the electronic document format by using the electronic document writer 102. Moreover, the output module outputs the converted data. The destination to output the converted data is the file opened in step S901.

In step S903, the bookbinding application 104 determines whether all the designated data has been completely converted. If it is determined that the conversion has not been completed (NO in step S903), then the processing returns to step S902. On the other hand, if it is determined that the conversion has been completed (YES in step S903), then the processing advances to step S904. In step S904, the bookbinding application 104 closes the electronic document file.

The electronic document file generated by the electronic document writer 102 is a file including the entity of the document page data illustrated in FIG. 3.

The bookbinding application 104 can generate a book file based on the application data in the above-described manner.

The following editing operations can be executed on a chapter and a page of the book file generated in the above-described manner.

(1) Adding a new chapter or page
(2) Deletion
(3) Copying
(4) Cutting
(5) Pasting
(6) Moving
(7) Renaming of chapter
(8) Changing the page number or renaming the page name
(9) Inserting a front cover sheet
(10) Inserting a sheet
(11) Inserting an index sheet
(12) Designating the page layout to each document page In addition to the operations described above, an operation for canceling the once designated editing operation and an operation for re-designating the once cancelled operation can be executed. By executing the above-described editing functions, editing operations, such as integrating with a plurality of book files, rearranging a chapter or a page within a book file, deleting a chapter or a page from a book file, changing a layout of a document page, and inserting a sheet or an index sheet, can be implemented.

After the above-described editing operation is executed, the result of the operation is applied to the attribute illustrated in FIGS. 4A through 6 or to the structure of the book file. For example, if a blank page is newly added, the blank page is inserted at a designated portion of the chapter. The inserted blank page is handled as a document page.

On the other hand, if the layout of a document page is changed, the content of the change is applied to the attribute, such as the printing method, N-up printing, the front cover sheet/spine/back cover, the index sheet, the inserted sheet, and the chapter break.

The display and operation executed during an editing operation according to the present exemplary embodiment will be described in detail below.

The book file that is generated and edited in the above-described manner is intended to be finally printed or output. When the user selects a file menu on the UI screen (the operation screen illustrated in FIG. 9) of the bookbinding application and selects "print" from the menu, the book file is printed and output by a designated output device.

In this case, at first, the bookbinding application 104 generates a job ticket based on the currently opened book file and transmits the generated job ticket to the electronic document despooler 105. After receiving the job ticket, the electronic document despooler 105 converts the received job ticket into an output command of the OS, such as a GDI command of Windows®. The electronic document despooler 105 further transmits the converted command to the output module such as a GDI.

The output module generates a command that complies with the type of the device by using a designated printer driver 106 and transmits the generated command to the device. More specifically, a graphic engine of the output module loads the printer driver 106 which is provided to each printing apparatus from the external memory 211 onto the RAM 202 and sets the output to the printer driver 106.

Then, the output module converts the received GDI function into a DDI function and then outputs the converted DDI function to the printer driver 106. The printer driver 106 converts the received DDI function into a control command that the printer 107 can interpret, such as a page description language (PDL).

The converted printer control command is then output, as print data, to the printer 107 via the system spooler loaded on the RAM 202 by the OS and the interface 21.

In the present exemplary embodiment, a job ticket is data having a structure in which a document page is a minimum unit. The structure of the job ticket defines the layout of the document page on the sheet. Furthermore, one job ticket is issued for each job.

Therefore, in the job ticket, a document node exists in the top layer which defines the attribute of the entire document, such as the attribute "one-sided printing/two-sided printing". Below the document node, a sheet node exists which includes an attribute such as an identifier of a sheet to be used and designation of a sheet feed port of the printer. Each sheet node includes a node of a sheet to be printed on a paper sheet. One "sheet" included in the sheet node corresponds to one paper sheet.

Each "sheet" includes the attribute of a page to be printed (physical page). If one-sided printing is designated, one sheet includes one physical page. On the other hand, if two-sided printing is designated, then one sheet includes two physical pages. Each physical page includes a document page to be provided thereon. In addition, the layout of the document page is included in the attribute of the physical page.

An exemplary data structure of a job ticket will be described in detail below with reference to FIG. 12.

Figure 12:
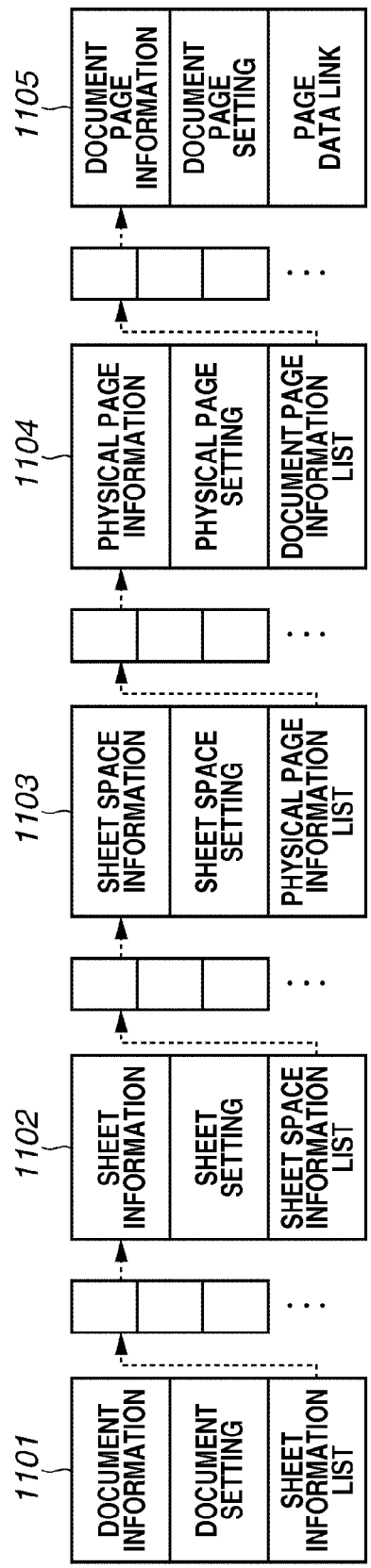
FIG. 12 illustrates an exemplary structure of data of a document file according to an exemplary embodiment of the present invention.

FIG. 12 illustrates an exemplary structure of data of a job ticket according to the present exemplary embodiment.

In the print data, a document includes an aggregate of sheets. Each sheet includes two sides of the sheet (the front and the back sides).

Each of the front and the back sides includes an area in which the document is laid out (physical page). Each physical page includes an aggregate of document pages which is the minimum unit thereof.

Referring to FIG. 12, document information 1101 is data corresponding to the document. The document information 1101 includes information related to the entire document (a document setting) and a list of information about the sheets constituting the document.

Sheet information 1102 includes information about the sheet (a sheet setting), such as the paper size, and a list of information about a sheet space which is laid out on the sheet.

Sheet space information 1103 includes information unique to a sheet space (a sheet space setting) and a list of physical page information about the physical page to be imposed on the sheet space.

Physical page information 1104 includes information about the size and the header and footer of the physical page (a physical page setting) and a list of document page information which is information about the document pages constituting the physical page.

Document page information 1105 includes information about the document page (a document page setting) and a link to data of the document page.

The electronic document despooler 105 converts the job ticket into the output command to the output module. If the printer 107 can interpret JDF which is a standard format of a job ticket, the electronic document despooler 105 can generate a job ticket in the JDF format including an instruction to the printer 107 and issue an output instruction to the printer 107.

In this case, the electronic document despooler 105 reads the designated book file 103 from the hard disk and generates the job ticket in the JDF format to print each page in the format described in the read book file 103. In addition, the electronic document despooler 105 transmits the generated job ticket of the JDF format to the designated printer 107 together with the drawing data.

The printer 107 prints and executes finishing processing on the drawing data according to the instruction described in the JDF.

As described above, when a book file is opened by the bookbinding application 104, the UI screen 900 (FIG. 9) is displayed. The tree structure field 901 of the UI screen 900 displays a tree that indicates the structure of the currently opened book (hereinafter referred to as a "target book").

The preview field 902 includes three different display methods that can be designated by the user as desired. A first display method is a "document view mode". In the document view mode, the content of the document page data of the target book is reduced and displayed as it is without displaying the layout of the document page in the preview field 902.

A second display method is a "print view mode". In the print view mode, the document page is displayed in the preview field 902 in a state in which the layout of the document page is applied.

A third display method is a "simple print view mode". In the simple print view mode, the content of each document page is not applied in the display in the preview field 902 and only the layout thereof is displayed.

Shifting among the above-described modes is implemented by operating a mode switching unit 904. The mode switching unit 904 is implemented by a pull-down menu in the present exemplary embodiment. The user can shift the mode to a desired mode by arbitrarily selecting the mode from among the modes registered in the pull-down menu.

The bookbinding application 104 in the document processing system according to the present exemplary embodiment includes a function for registering, within the document processing system, a job ticket of the JDF format generated in a different other system.

Figure 13:
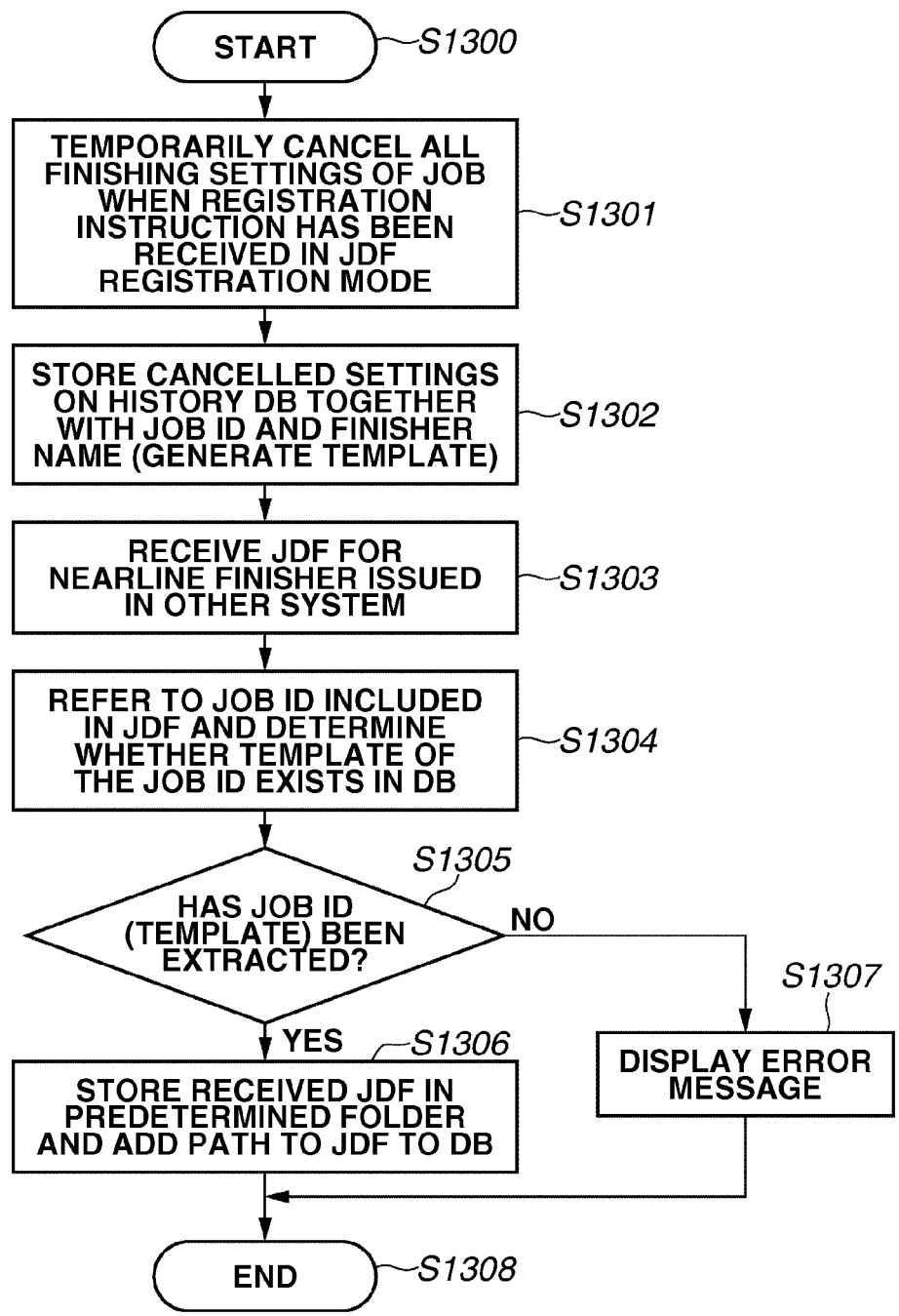
FIG. 13 is a flow chart illustrating exemplary JDF registration processing executed in the document processing system according to an exemplary embodiment of the present invention.

FIG. 13 is a flow chart illustrating exemplary JDF registration processing executed by the bookbinding application 104 according to the present exemplary embodiment.

Before describing the details of the processing illustrated in FIG. 13, an example of JDF registration will be described in detail below with reference to FIG. 14.

Figure 14:
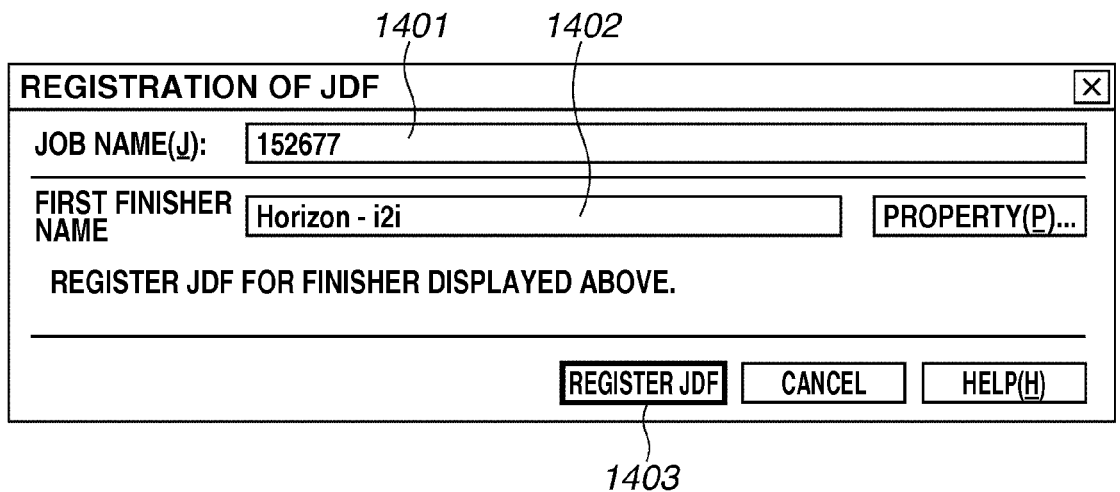
FIG. 14 illustrates an example of a user interface screen used in executing JDF registration processing in the document processing system according to an exemplary embodiment of the present invention.

FIG. 14 illustrates an example of a screen (window) used in JDF registration processing executed by the bookbinding application 104 of the document processing system according to the present exemplary embodiment.

Referring to FIG. 14, in an area 1401 for designating a "job identification (ID)" for registering the JDF, a digit string "152677" is designated.

An area 1402 is an area for designating the name of the nearline finisher corresponding to the JDF to be registered. When the user operates a "JDF registration" button 1403 to instruct the registration of the JDF, the bookbinding application 104 becomes enabled to receive the JDF transmitted from another system. After receiving the JDF, the bookbinding application 104 automatically starts registering the received JDF within the document processing system.

The JDF registration processing according to the present exemplary embodiment will be described in detail below with reference to FIG. 13 with the above-described configuration as the premise thereof. The processing illustrated in FIG. 13 is executed when the user issues an instruction for starting the registration of the JDF by pressing the JDF registration button 1403 (FIG. 14).

Referring to FIG. 13, in step S1301, the bookbinding application 104 temporarily cancels the attribute about the finishing, such as "stapling", "punching", "saddle stitch binding", "case binding", and "cut on three sides", among the print setting set on the currently opened book file. In the present exemplary embodiment, it is supposed that "case binding" is set to the currently opened book file as the finishing attribute. Then, the processing advances to step S1302.

In step S1302, the bookbinding application 104 secures a new JDF storage destination area (a template) on a JDF registering database (DB) 108. In other words, the bookbinding application 104 stores the cancelled settings on a history database together with a job ID and a finisher name.

FIG. 15 illustrates an example of a JDF storage destination area (a template) secured in step S1302 according to the present exemplary embodiment.

In FIG. 15, it is indicated that a new storage area has been generated for a job. A "job ID" and a "device name" which have been designated via the JDF registration window illustrated in FIG. 14 are added to the JDF storage destination area.

Further, information about the finishing attribute cancelled in step S1301 is described in a "setting attribute" field. The finishing attribute canceled in step S1301 is a setting attribute of the JDF which is to be issued by the operator (user) by the nearline finisher dedicated application (the finisher dedicated application 109) at a later stage. The JDF issued by the operator is then transmitted to the bookbinding application 104.

By managing the parameters "device name" and the "setting attribute" as a set, the present exemplary embodiment can store the JDF in the manner that can allow the user to recognize what kind of instruction the JDF is intended to indicate and to which device the instruction is to be issued. In FIG. 15, a field "JDF storage destination" (a path to JDF), which is currently left blank, is to be filled with a step which will be described in detail below.

Meanwhile, the user issues a JDF that instructs case binding from the finisher dedicated application 109 to the nearline finisher 110 and transmits the JDF to the bookbinding application 104. In step S1303, the bookbinding application 104 receives the transmitted JDF. When a JDF is issued, the user provides a "job ID" designated in the JDF registration window (FIG. 14). Then, the processing advances to step S1304.

In step S1304, the bookbinding application 104 refers to the job ID described in the received JDF to verify whether any storage destination for storing the job ID exists on the JDF registering DB 108. In step S1305, the bookbinding application 104 determines whether any storage destination for storing the job ID is extracted. If it is determined that any storage destination for storing the job ID is extracted (YES in step S1305), then the processing advances to step S1306.

In step S1306, the bookbinding application 104 stores the JDF received in step S1303 in a predetermined location (area) of the JDF registering DB 108. In addition, the bookbinding application 104 adds the path to the storage area to the JDF storage destination area (FIG. 15). FIG. 16 illustrates a state after the path is added to the JDF storage destination area in step S1306 according to the present exemplary embodiment.

On the other hand, if it is determined that no storage destination for storing the job ID is extracted (NO in step S1305), then the processing advances to step S1307. In step S1307, the bookbinding application 104 displays an error message. Then, the processing advances to step S1308. In step S1308, the JDF registration processing ends.

In the above-described manner, the present exemplary embodiment registers the JDF on the JDF registering DB 108 so that the user can easily recognize which device the JDF is to be transmitted to and what kind of instruction the JDF is intended to implement.

The bookbinding application 104 provides a window that allows the user to directly edit the content of the JDF registered on the JDF registering DB 108.

Figure 24:
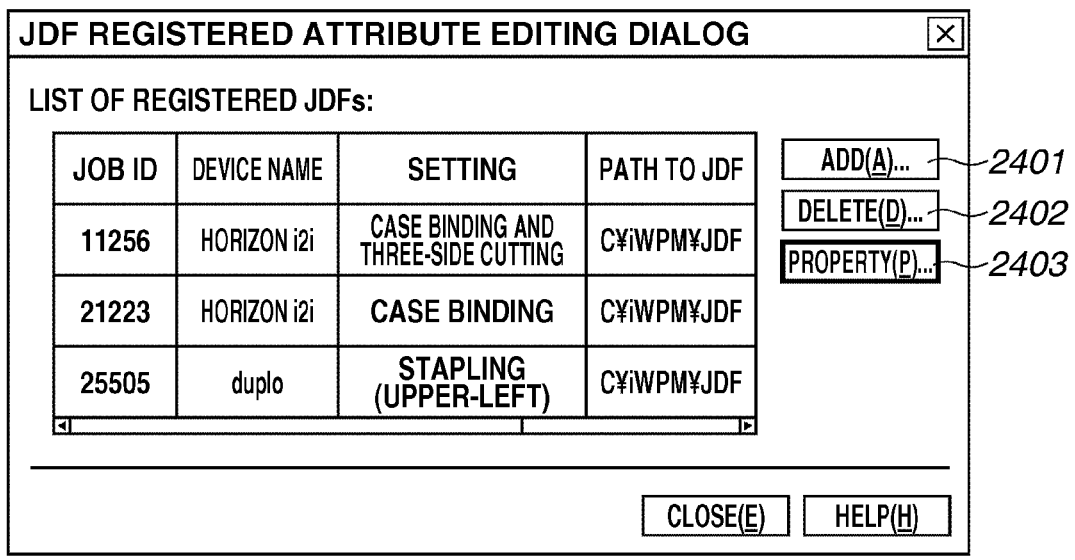
FIG. 24 illustrates an example of a user interface screen used for editing a registered JDF attribute in the document processing system according to an exemplary embodiment of the present invention.

FIG. 24 illustrates an example of a "JDF registration information" window displayed by the bookbinding application 104 according to the present exemplary embodiment. The user can verify the content of the JDF registered on the JDF registering DB 108 on the JDF registration information window.

The user can operate an "add" button 2401 to register a new JDF. Further, the user can delete a currently selected job ID and a JDF linked with the JDF storage destination path by operating a "delete" button 2402. Furthermore, the user can display a window (FIG. 25) for changing information about the currently selected job ID by operating a "property" button 2403 (FIG. 24).

The user can change the content of the JDF registered on the JDF registering DB 108 (namely, information such as "job ID", "device name", "setting attribute", and "JDF storage destination path") via a "JDF registered attribute changing" window illustrated in FIG. 25.

The bookbinding application 104 according to the present exemplary embodiment can execute printing and finishing by using a combination of the printer and the nearline finisher. In this case, the electronic document despooler 105, after receiving an instruction for printing from the bookbinding application 104, issues a JDF for instructing printing to the printer 107.

Furthermore, with respect to the nearline finisher, the electronic document despooler 105 searches for a JDF including a finishing attribute set to the book file from among the JDFs registered on the host computer 100 (within the document processing system) and issues a finishing instruction by using the JDF or a part of the JDF.

JDF printing processing executed by the bookbinding application 104 of the document processing system according to the present exemplary embodiment by using a combination of the printer and the nearline finisher will be described in detail below with reference to FIGS. 17 and 18.

FIG. 18 illustrates an example of display of a "JDF output window" displayed by the bookbinding application 104 of the document processing system according to the present exemplary embodiment.

Referring to FIG. 18, an area 1801 is an area for designating a job name. An area 1802 is an area for designating a user name. Both of the areas 1801 and 1802 can store a parameter value described with an arbitrary character string. The parameter value of the areas 1801 and 1802 is also described in the JDF by the electronic document despooler 105.

An area 1803 is an area for designating the printer to be used. FIG. 18 indicates that the user has instructed to execute post-processing on the nearline finisher because the user has marked a checkbox 1804.

Accordingly, among the print settings set to the book file, only printing is executed by a printer designated in the area 1803 and the finishing processing can be executed on a dedicated nearline finisher.

An area 1805 is an area for designating a nearline finisher to be used for executing the finishing processing. The area 1805 becomes enabled only when the user has marked the checkbox 1804. In addition, the user can designate a plurality of nearline finishers by pressing an "add finisher" button 1806.

FIG. 19 illustrates an example of a state of a window displayed when the user presses the "add finisher" button 1806 twice. In FIG. 19, the user can designate three finishers. More specifically, the user can designate a first, a second, and a third finishers according to order of executing the finishing processing.

If a plurality of nearline finishers has been designated, the bookbinding application 104 transmits, to each finisher, a JDF including an instruction of a necessary finishing operation only. If a book file includes the print setting related to finishing such as "insert index sheet", "stapling", and "punching", for example, then the bookbinding application 104 transmits a JDF including an instruction for inserting an index sheet to the first finisher.

When the user presses an OK button to issue an instruction for printing of the JDF, the bookbinding application 104 starts processing for printing the JDF by using a combination of the printer and the nearline finisher.

The JDF printing processing executed by the bookbinding application 104 by using a combination of the printer and the nearline finisher will be described in detail below with reference to the flow chart of FIG. 17. When the user issues an instruction for printing the JDF via the "JDF output window" (FIG. 18), the bookbinding application 104 starts the JDF printing processing illustrated in FIG. 17.

Figure 17:
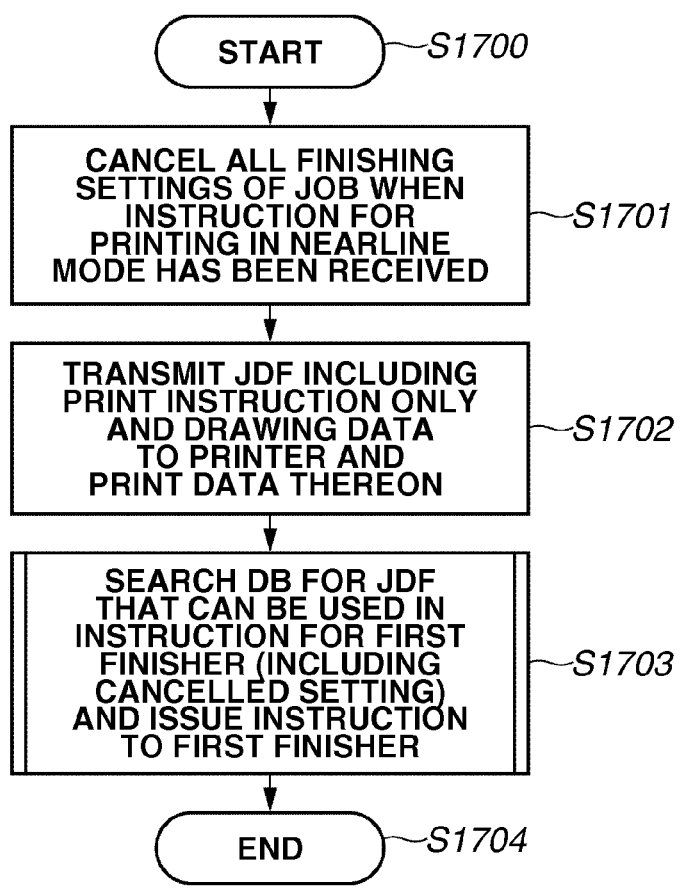
FIG. 17 is a flow chart illustrating exemplary JDF output processing executed in the document processing system according to an exemplary embodiment of the present invention.

If it has been instructed by the user to execute post processing on the nearline finisher by marking the area 1804 (FIG. 18), then in step S1701 in FIG. 17, the bookbinding application 104 temporarily cancels all attributes related to the finishing among the print settings included in the book file.

For example, "stapling", "punching", "saddle stitch binding", "case binding, and "cut on three sides" can be temporarily cancelled. In the present exemplary embodiment, it is supposed that "case binding" and "cut on three sides" are designated in the book file as the finishing attribute. Then, the processing advances to step S1702.

In step S1702, the bookbinding application 104 generates a JDF including only a print instruction with the electronic document despooler 105. Further, the bookbinding application 104 controls the electronic document despooler 105 to transmit the generated JDF to the printer to be used (the printer designated in the area 1803 in FIG. 18) to print the JDF on the printer 107.

In the present exemplary embodiment, the printer 107 and the nearline finisher 110 are not physically connected to each other. Accordingly, it is necessary for the user to carry the printed sheets output by the printer 107 to the nearline finisher 110.

In step S1703, the bookbinding application 104 searches for a JDF that can instruct "case binding" and "cut on three sides" to the nearline finisher from among those stored on the JDF registering DB 108. If any such JDF is extracted, the bookbinding application 104 transfers the same to the electronic document despooler 105. In addition, the bookbinding application 104 transmits the JDF to the nearline finisher 110 via the electronic document despooler 105 to issue a finishing instruction.

If the first through the third finishers have been designated as illustrated in FIG. 19, then the electronic document despooler 105 transmits a JDF including an instruction for executing necessary finishing processing only to each finisher. If finishing processing such as "insert index sheet", "stapling", and "punching" is designated, then the bookbinding application 104 searches for a JDF that can instruct the first finisher to execute "inserting an index sheet" from among those stored on the JDF registering DB 108. If any such JDF is extracted, then the bookbinding application 104 transmits the extracted JDF to the electronic document despooler 105.

In a similar manner, the bookbinding application 104 searches for a JDF including a necessary instruction with respect to the second and the third finishers, and transmits the extracted JDF to the electronic document despooler 105. The electronic document despooler 105 serially transmits the received JDFs to the corresponding nearline finishers, respectively, to instruct the finishing processing "insert index sheet", "stapling", and "punching" in this order.

JDF searching processing executed in step S1703 (FIG. 17) according to the present exemplary embodiment will be described in detail below with reference to the flow chart of FIG. 20.

Figure 20:
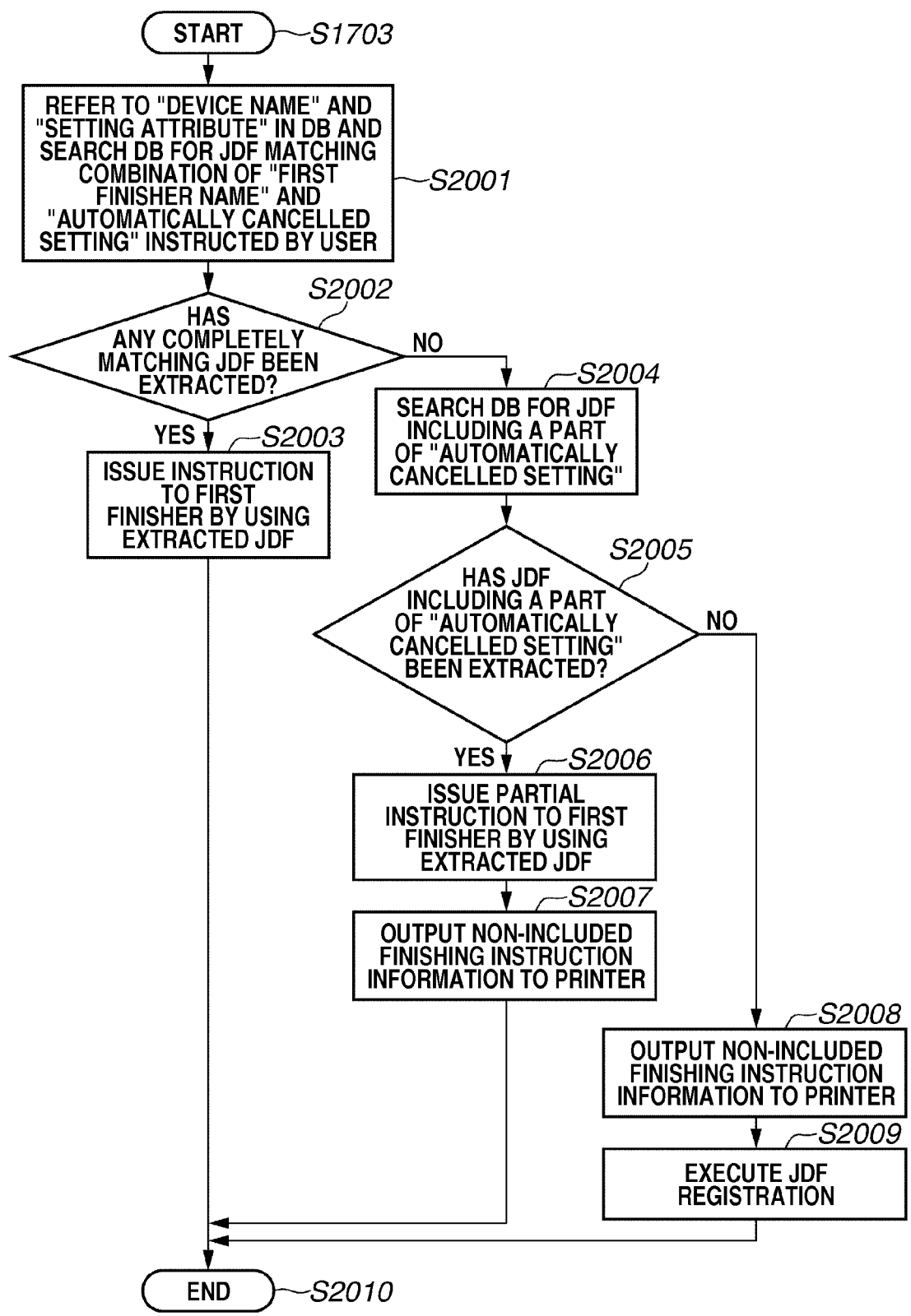
FIG. 20 is a flow chart illustrating exemplary JDF output processing executed in the document processing system according to an exemplary embodiment of the present invention.

Referring to FIG. 20, in step S2001, the bookbinding application 104 refers to the "device name" field and the "setting attribute" field in the JDF registering DB 108. Further, the bookbinding application 104 searches for a JDF matching the combination of the name of the nearline finisher (the name of the first finisher) designated in the area 1805 (FIG. 18) and the finishing attribute (in the present exemplary embodiment, "case binding" and "cut on three sides") designated in the book file.

In step S2002, the bookbinding application 104 determines whether the JDF matching the above-described combination exists. If a completely matching JDF has been extracted (YES in step S2002), then the processing advances to step S2003.

In step S2003, the bookbinding application 104 transmits the extracted JDF to the first finisher via the electronic document despooler 105. Thus, the bookbinding application 104 issues a finishing instruction to the first finisher.

On the other hand, if no completely matching JDF has been extracted (NO in step S2002), then the processing advances to step S2004. In step S2004, the bookbinding application 104 searches for a JDF including a part of the finishing attribute set in the book file.

In step S2005, the bookbinding application 104 determines whether the JDF including a part of the finishing attribute set in the book file exists. If the JDF including a part of the finishing attribute set in the book file exists (YES in step S2005), then the processing advances to step S2006.

In step S2006, the bookbinding application 104 transmits the extracted JDF to the first finisher via the electronic document despooler 105. Thus, the bookbinding application 104 issues an instruction for executing a part of the finishing processing.

In step 2007, the bookbinding application 104 outputs information about the other finishing attribute (instruction not included in the JDF) to the printer 107. With the above-described configuration, the user can issue an instruction for executing the finishing processing not included in the JDF from the finisher dedicated application 109 to the nearline finisher 110 while confirming a sheet output from the printer 107 on which the information about the finishing attribute not included in the JDF is printed.

On the other hand, if the JDF is not extracted that includes any part of the finishing attribute (NO in step S2005), then the processing advances to step S2008.

In step S2008, the bookbinding application 104 outputs information about the finishing attribute that has not been instructed to the printer 107. Accordingly, the user can issue an instruction for executing the finishing processing from the finisher dedicated application 109 to the nearline finisher 110 while confirming the sheet output from the printer 107 on which the information about the finishing attribute is printed. Then, then the processing advances to step S2009.

In step S2009, the bookbinding application 104 executes the JDF registration processing illustrated in the flow chart of FIG. 17.

In the flow chart illustrated in FIG. 17, the computer (the document processing system) 100 searches for a usable JDF and instructs the nearline finisher 110 to execute the finishing processing. However, the present invention is not limited to this.

More specifically, the bookbinding application 104 of the document processing system 100 according to the present exemplary embodiment allows the user to select a JDF for instructing the nearline finisher 110 from among the JDFs registered on the JDF registering DB 108. In this case, when the user presses a property button 1807 in FIG. 18, a "registered JDF selection" window illustrated in FIG. 26 is displayed.

In FIG. 26, information about the JDF stored in association with the finisher selected in the area 1805 (FIG. 18) only is displayed. Accordingly, the user can select a JDF including a necessary instruction to be issued to the nearline finisher by marking a checkbox 2601.

In this case, the bookbinding application 104 does not execute JDF searching processing and transmits the JDF selected by the user from the electronic document despooler 105 to the nearline finisher 110 as it is.

Figure 27:
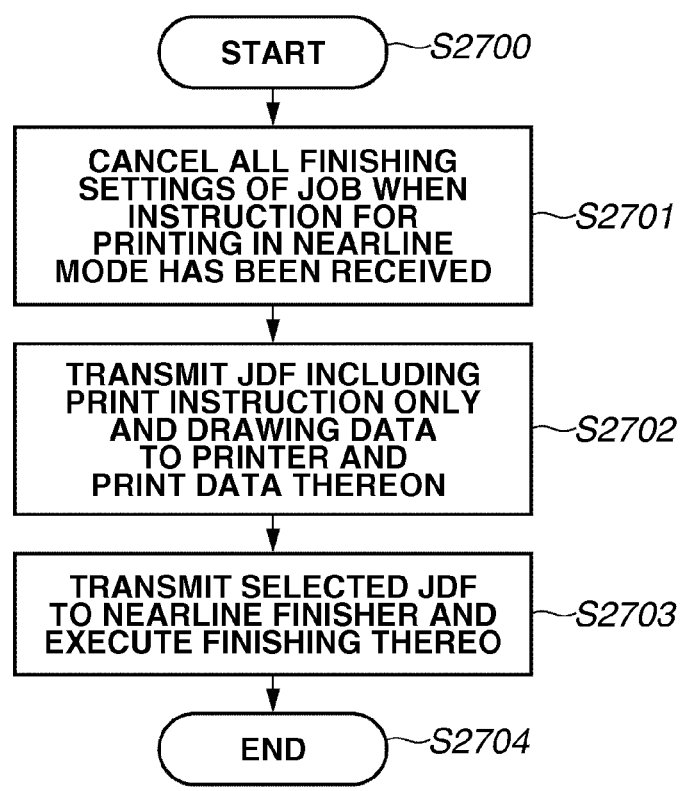
FIG. 27 is a flow chart illustrating exemplary JDF output processing executed in the document processing system according to an exemplary embodiment of the present invention.

FIG. 27 is a flow chart illustrating an exemplary flow of JDF printing processing executed if the user selects a JDF to be used from among the JDFs registered on the JDF registering DB 108 according to the present exemplary embodiment.

Referring to FIG. 27, processing in steps 2701 and 2702 is similar to that in steps S1701 and S1702 (FIG. 17). Processing in step S2703 is different from the processing illustrated in FIG. 17.

More specifically, in step S2703, the bookbinding application 104 transmits the JDF selected by the user by marking the checkbox 2601 to the electronic document despooler 105. The electronic document despooler 105 transmits the received JDF to the finisher selected in the area 1805 (FIG. 18). Thus, the bookbinding application 104 issues an instruction for executing the designated finishing processing.

In the JDF registration processing described above with reference to the flow chart of FIG. 13 according to the first exemplary embodiment, the JDF for the nearline finisher is only registered within the computer (document processing system) 100.

According to a second exemplary embodiment, the JDF can be automatically registered within the document processing system while the user executes the operation.

The second exemplary embodiment of the present invention will be described in detail below with reference to FIGS. 21 and 22, in which the bookbinding application 104 is configured to acquire a JDF including a finishing instruction to the nearline finisher while the user executes an operation and to register the acquired JDF within the document processing system.

FIG. 22 illustrates an expanded example of the JDF output window illustrated in FIG. 18 to execute JDF registration processing while executing printing of the JDF. The component areas of the window illustrated in FIG. 22 similar to those in the window illustrated in FIG. 18 are provided with the same reference numeral.

Referring to FIG. 22, a "register JDF for nearline finisher" check box 2201 is added to the window illustrated in FIG. 18. If the user marks the checkbox 2201, the JDF for the nearline finisher can be simultaneously registered in the document processing system while the printer and the nearline finisher execute the processing.

Figure 21:
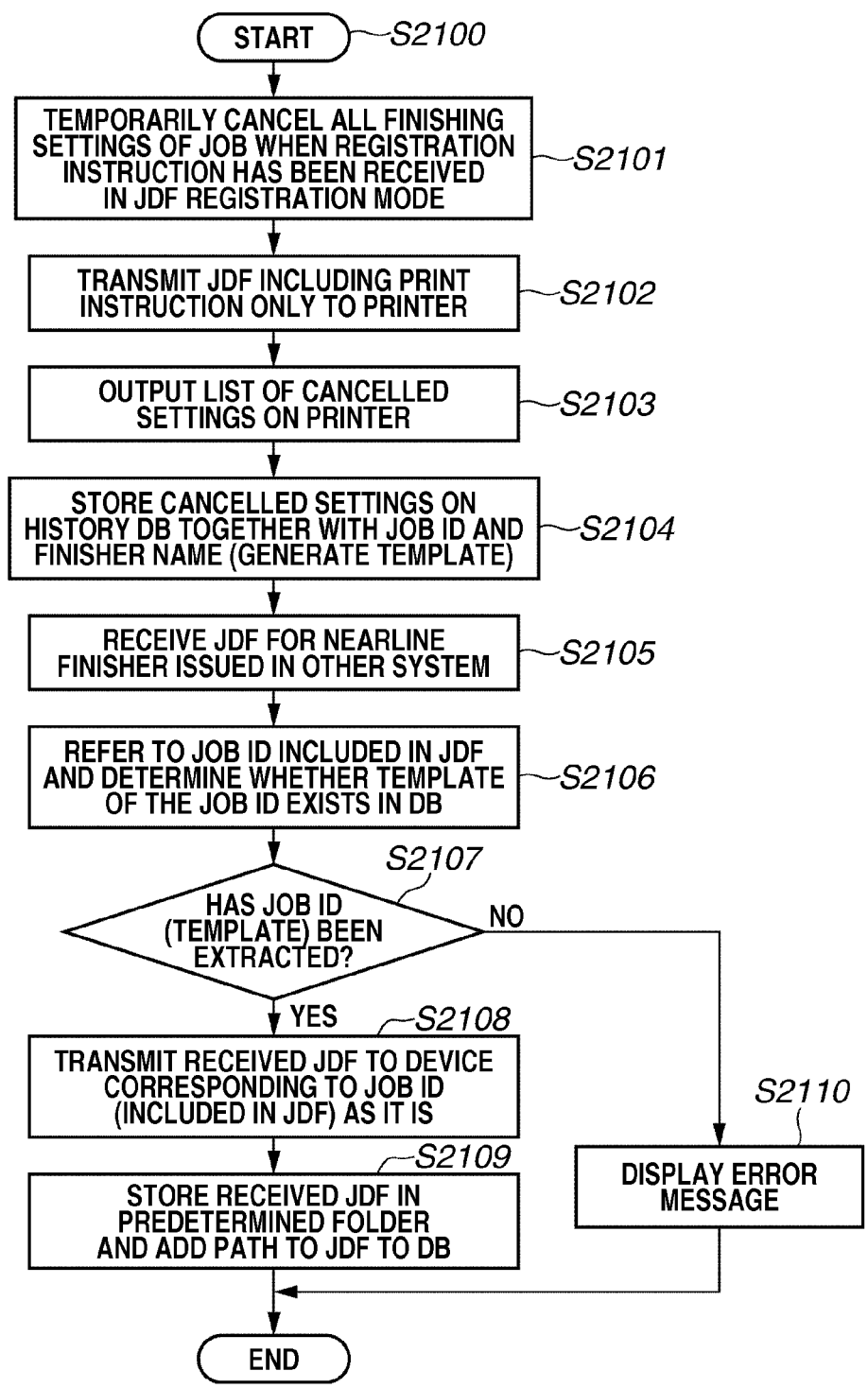
FIG. 21 is a flow chart illustrating exemplary JDF registration processing executed in the document processing system according to an exemplary embodiment of the present invention.

FIG. 21 is a flow chart illustrating exemplary JDF registration processing executed while the user executes an operation according to the present exemplary embodiment.

According to the processing for outputting a JDF using a combination of a normal printer and the nearline finisher (by pressing the property button 1807 illustrated in FIG. 18), the user can issue an instruction for outputting the JDF in the book file generated by the bookbinding application 104. In the present exemplary embodiment, it is supposed that "case binding" and "cut on three sides" are designated as the finishing attribute.

In this case, the bookbinding application 104 verifies whether the user has issued an instruction for executing post-processing on the nearline finisher via the area 1804 illustrated in FIG. 18. If the area 1804 illustrated in FIG. 18 has been marked, then the processing advances to step S1701 (FIG. 17).

In step S1701, the bookbinding application 104 temporarily cancels the attributes related to the finishing, such as "stapling", "punching", "saddle stitch binding", "case binding, and "cut on three sides" among the print settings included in the book file. In the present exemplary embodiment, the bookbinding application 104 temporarily cancels "case binding" and "cut on three sides". Then, the processing advances to step S2102.

In step S2102, the bookbinding application 104 issues a job ticket that does not include a finishing instruction and transmits the issued job ticket to the electronic document despooler 105.

Then, the bookbinding application 104 causes the electronic document despooler 105 to issue a JDF that includes only a print instruction and to transmit the JDF to the printer to be used (the printer designated in the area 1803 in FIG. 18).

In the above-described manner, the printer 107 executes the printing only. In this case, it is necessary for the user to carry the printed sheets output by the printer 107 to the nearline finisher 110.

In step S2103, the bookbinding application 104 temporarily generates a page that describes all the finishing settings (in the present exemplary embodiment, "case binding" and "cut on three sides") that have been canceled in step S2101 and outputs the page to the printer 107. Then, the processing advances to step S2104.

In step S2104, the bookbinding application 104 secures a JDF storage destination area (a template) illustrated in FIG. 15 on the JDF registering DB 108. In this case, the bookbinding application 104 adds, to the JDF storage destination, the "job ID" and the "finisher name" which have been designated by the user via the JDF output registration screen illustrated in FIG. 18, and the finishing attribute which has been temporarily cancelled in step S2101.

FIG. 23 illustrates an example of an output result of a "list of cancelled finishing settings" which is output by the printer 107 in step S2103 (FIG. 21), according to the present exemplary embodiment.

The user can issue a JDF instructing the execution of the finishing ("case binding" and "cut on three sides") from the finisher dedicated application 109 to the nearline finisher 110 while confirming the output result.

Then, the user transmits the JDF that instructs "case binding" and "cut on three sides" to the nearline finisher 110. The nearline finisher 110 is registered with an Internet protocol (IP) address in the document processing system as described above. Accordingly, the JDF is automatically transmitted to the computer (the document processing system) 100.

In step S2105, the bookbinding application 104 receives the JDF including the instruction for executing the finishing processing "case binding" and "cut on three sides" that has been transmitted to the document processing system.

In step S2106, the bookbinding application 104 refers to the job ID included in the JDF to determine whether the job ID matches the "job ID" of the template generated in step S2104 included in the JDF registering DB 108.

In step S2107, the bookbinding application 104 determines whether the job ID in the JDF matches the "job ID" in the template. If the job ID in the JDF matches the "job ID" in the template (YES in step S2107), then the processing advances to step S2108.

In step S2108, the bookbinding application 104 transmits the received JDF to the electronic document despooler 105. The electronic document despooler 105 refers to the "finisher name" information in the template and transmits the received JDF to the finisher described in the JDF as it is.

The finisher 110 executes the finishing processing "case binding" and "cut on three sides". Accordingly, the user can acquire a desired product.

In step S2109, the bookbinding application 104 stores the received JDF in a predetermined folder of the JDF registering DB 108 and adds the path to the storage destination to the "JDF storage destination" of the template.

On the other hand, if it is determined that the job ID in the JDF does not match the "job ID" in the template (NO in step S2107), then the processing advances to step S2110. In step S2110, the bookbinding application 104 displays an error message on the screen. Then, the processing ends.

With the above-described configuration, the present exemplary embodiment can allow the user to execute the JDF registration processing while executing another operational work. Accordingly, the present exemplary embodiment can reduce the user's trouble of executing additional processing for registering a JDF.

An embodiment of the present invention can provide an information processing apparatus configured to control an image forming apparatus and a post-processing apparatus configured to execute post-processing on a product output by the image forming apparatus, the information processing apparatus comprising: a registration unit configured to register a job ticket generated by another information processing apparatus; a searching unit configured to search for a job ticket that can be used for issuing an instruction to the post-processing apparatus from among the job tickets registered by the registration unit; and an instruction unit configured to issue an instruction to the post-processing apparatus by utilizing the job ticket extracted as a result of the search by the searching unit.

In such a information processing apparatus the registration unit registers a name of the post-processing apparatus that can receive the job ticket, setting information included in the job ticket, and information about a location for storing the job ticket in association with one another.

Preferably, the information processing apparatus further comprises: a setting unit configured to set an attribute including imposition processing and post-processing, wherein the instruction unit instructs the image forming apparatus and the post-processing apparatus to execute print processing and post-processing according to the attribute set by the setting unit.

Preferably, the information processing apparatus further comprising a changing unit configured to change a content registered by the registration unit.

Preferably, the changing unit changes a name and setting information of the post-processing apparatus, and a storage location of the name and the setting information.

Preferably, the registration unit registers the job ticket that can instruct the post-processing apparatus to execute processing according to the instruction issued by the instruction unit.

Preferably, an attribute related to post-processing which is set by an application program is temporarily cancelled to generate a job ticket dedicated to printing, and a list of cancelled attributes related to the post-processing is output to the image forming apparatus.

Preferably, the information processing apparatus further comprises a selection unit configured to allow a user to select the job ticket to be used for issuing the instruction to the post-processing apparatus from among the job tickets previously registered by the registration unit.

Another embodiment of the invention can provide a method for controlling an image forming apparatus and a post-processing apparatus configured to execute post-processing on a product output by the image forming apparatus, the method comprising: registering a job ticket generated by another information processing apparatus; searching for a job ticket that can be used for issuing an instruction to the post-processing apparatus from among the registered job tickets; and issuing an instruction to the post-processing apparatus by utilizing the job ticket extracted as a result of the search.

A further embodiment of the invention can provide computer-executable instructions which cause a computer to execute a method for controlling an image forming apparatus and a post-processing apparatus configured to execute post-processing on a product output by the image forming apparatus, the instructions comprising: registering a job ticket generated by another information processing apparatus; searching for a job ticket that can be used for issuing an instruction to the post-processing apparatus from among the registered job tickets; and issuing an instruction to the post-processing apparatus by utilizing the job ticket extracted as a result of the search.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-183789 filed Jul. 15, 2008, which is hereby incorporated by reference herein in its entirety.

What is claimed is:

1. An information processing apparatus configured to control an image forming apparatus and a post-processing apparatus configured to execute post-processing on a product output by the image forming apparatus, the information processing apparatus comprising:
a registration unit configured to register a job ticket for controlling the post-processing apparatus, wherein the job ticket is generated by a dedicated application;
a setting unit configured to set an attribute including imposition processing and post-processing, wherein the attribute is set in association with a name of a post-processing apparatus capable of accepting the job ticket and setting information included in the job ticket;
a designation unit configured to designate a post-processing apparatus for execution of the post-processing;
a searching unit configured to search for a job ticket that can be used for issuing an instruction to the post-processing apparatus designated by the designation unit from among job tickets registered by the registration unit based on the attribute set by the setting unit; and
an instruction unit configured to issue an instruction to the post-processing apparatus by utilizing the job ticket extracted as a result of searching for the job ticket by the searching unit.

2. The information processing apparatus according to claim 1, wherein the job ticket is generated by another information processing apparatus.

3. The information processing apparatus according to claim 2, further comprising: a control unit which temporarily cancels an attribute related to post-processing which is set by an application program and a storing unit for storing the temporarily cancelled attribute, prior to registering the job ticket generated by the another information processing system.

4. The information processing apparatus according to claim 1, wherein the registration unit registers a name of the post-processing apparatus that can receive the job ticket, setting information included in the job ticket, and information about a location for storing the job ticket in association with another job ticket.

5. The information processing apparatus according to claim 1, further comprising:
a setting unit configured to set an attribute including imposition processing and post-processing, wherein
the instruction unit instructs the image forming apparatus and the post-processing apparatus to execute print processing and post-processing according to the attribute set by the setting unit.

6. The information processing apparatus according to claim 1, further comprising a changing unit configured to change a content registered by the registration unit.

7. The information processing apparatus according to claim 6, wherein the changing unit changes a name and setting information of the post-processing apparatus, and a storage location of the name and the setting information.

8. The information processing apparatus according to claim 1, wherein the registration unit registers the job ticket that can instruct the post-processing apparatus to execute processing according to the instruction issued by the instruction unit.

9. The information processing apparatus according to claim 2, further comprising: an outputting unit which outputs a list of cancelled attributes related to the post-processing to the image forming apparatus.

10. The information processing apparatus according to claim 1, further comprising: a selection unit configured to allow a user to select the job ticket to be used for issuing the instruction to the post-processing apparatus from among the job tickets previously registered by the registration unit.

11. The information processing apparatus according to claim 1, further comprising: an output unit configured to output information indicating unmatched post-processing between the job ticket searched by the searching unit and the attribute set by the setting unit, in response to the unmatched post-processing existing.

12. A method for controlling an information processing apparatus configured to control an image forming apparatus and a post-processing apparatus configured to execute post-processing on a product output by the image forming apparatus, the method comprising:
registering a job ticket;
setting an attribute including imposition processing and post-processing, wherein the attribute is set in association with a name of a post-processing apparatus capable of accepting the job ticket and setting information included in the job ticket;
designating a post-processing apparatus for execution of the post-processing;
searching for a job ticket that can be used for issuing an instruction to the designated post-processing apparatus from among registered job tickets based on the set attribute; and
issuing an instruction to the post-processing apparatus by utilizing the job ticket extracted as a result of searching for the job ticket.

13. The method of claim 12, wherein the job ticket is generated by another information processing apparatus.

14. A non-transitory computer-readable storage medium storing a program causing an information processing apparatus to perform the method according to claim 12.

15. The non-transitory computer-readable storage medium of claim 14, wherein the job ticket is generated by another information processing apparatus.

16. The non-transitory computer-readable storage medium of claim 14, further comprising: outputting information indicating unmatched post-processing between the searched job ticket and the set attribute, in response to the unmatched post-processing existing.

17. The method of claim 12, further comprising: outputting information indicating unmatched post-processing between the searched job ticket and the set attribute, in response to the unmatched post-processing existing.

18. An information processing apparatus configured to control an image forming apparatus and a post-processing apparatus configured to execute post-processing on a product output by the image forming apparatus, the information processing apparatus comprising:
registration means for registering a job ticket;
setting means for setting an attribute including imposition processing and post-processing, wherein the attribute is set in association with a name of a post-processing apparatus capable of accepting the job ticket and setting information included in the job ticket;

designating means for designating a post-processing apparatus for execution of the post-processing;

searching means for searching for a job ticket that can be used for issuing an instruction to the designated post-processing apparatus from among registered job tickets based on the set attribute; and instruction means for issuing an instruction to the post-processing apparatus by utilizing the job ticket extracted as a result of searching for a job ticket.

19. The information processing apparatus according to claim 18, wherein the job ticket is generated by another information processing apparatus.

* * * * *